United States Patent
Uematsu

[19]

[11] Patent Number: 5,911,340
[45] Date of Patent: Jun. 15, 1999

[54] SPOUT ASSEMBLY, SPOUT ASSEMBLY MANUFACTURING APPARATUS AND PACKAGE WITH SPOUT ASSEMBLY

[75] Inventor: Hiroshi Uematsu, Tokyo-To, Japan

[73] Assignee: Dai Nippon Printing Co., Ltd., Japan

[21] Appl. No.: 08/711,006

[22] Filed: Sep. 11, 1996

[30] Foreign Application Priority Data

| Sep. 14, 1995 | [JP] | Japan | 7-236567 |
| Jan. 10, 1996 | [JP] | Japan | 8-002251 |
| Apr. 22, 1996 | [JP] | Japan | 8-100336 |

[51] Int. Cl.⁶ .................................................. B65D 35/44
[52] U.S. Cl. .................. 222/92; 222/107; 222/541.5; 222/541.9; 222/563; 215/48; 215/250; 220/254
[58] Field of Search ............... 222/92, 107, 541.5, 222/541.6, 541.9, 563; 215/45, 48, 50, 250; 220/254, 276

[56] References Cited

U.S. PATENT DOCUMENTS

| 3,187,966 | 6/1965 | Klygis | 222/541.5 X |
| 3,199,748 | 8/1965 | Bross | 222/563 X |
| 3,608,771 | 9/1971 | Monroe et al. | 222/541.9 X |
| 3,998,354 | 12/1976 | Song | 222/541.5 X |
| 4,019,663 | 4/1977 | Krautkramer | 222/541.5 X |
| 4,231,486 | 11/1980 | Bock | 220/266 |
| 4,415,085 | 11/1983 | Clarke et al. | 222/107 X |
| 4,732,299 | 3/1988 | Hoyt | 222/107 X |
| 4,785,951 | 11/1988 | Bennett | 222/541.5 X |
| 5,020,686 | 6/1991 | Dutt | 220/276 |
| 5,249,695 | 10/1993 | Luch et al. | 222/541.5 X |
| 5,348,183 | 9/1994 | Luch et al. | 222/541.5 X |
| 5,636,771 | 6/1997 | Gordon et al. | 222/541.5 |

FOREIGN PATENT DOCUMENTS

| 493 723 A1 | 7/1992 | European Pat. Off. . | |
| 1562177 | 4/1969 | France | 222/541.5 |
| 337741 | 5/1959 | Switzerland | 222/541.5 |
| 1444451 | 7/1976 | United Kingdom | 222/541.5 |
| 93/08092 | 4/1993 | WIPO . | |

*Primary Examiner*—Kenneth Bomberg
*Attorney, Agent, or Firm*—Parkhurst & Wendel, L.L.P

[57] ABSTRACT

A spout assembly comprises a spout (10) and a cap (20). The spout has a cylindrical outer tube (13) to be placed outside a package (15) and a base (12) to be bonded to the inner surface of the package (15). The cap (20) is separably connected to an extremity of the cylindrical outer tube (13) coaxially with the cylindrical outer tube (13) in a position in which the cap (20) is pushed into the cylindrical outer tube (13).

19 Claims, 23 Drawing Sheets

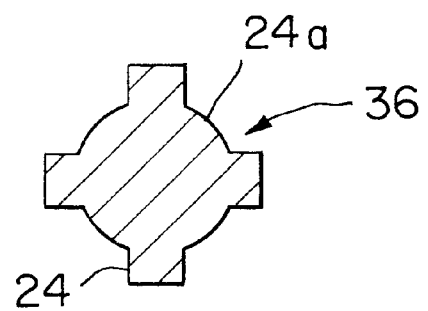
F I G. 17
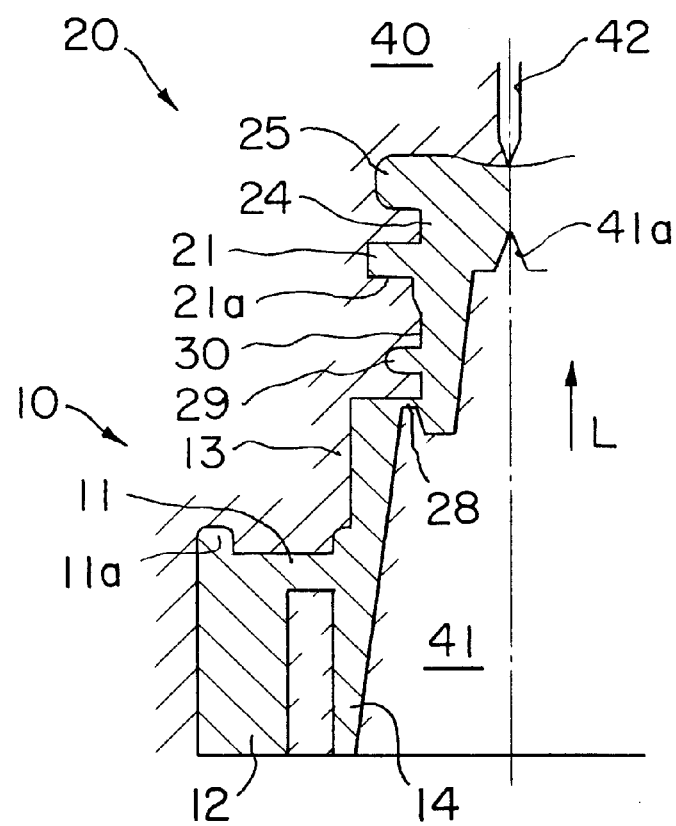
F I G. 18

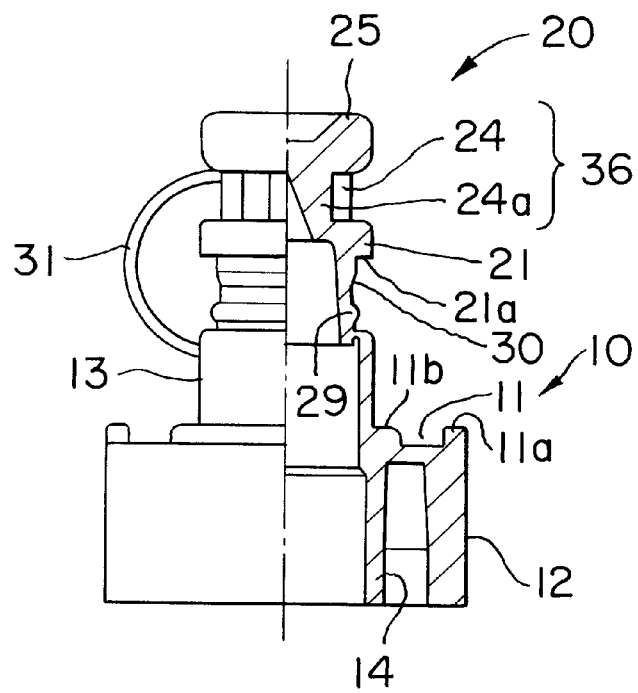
F I G. 22
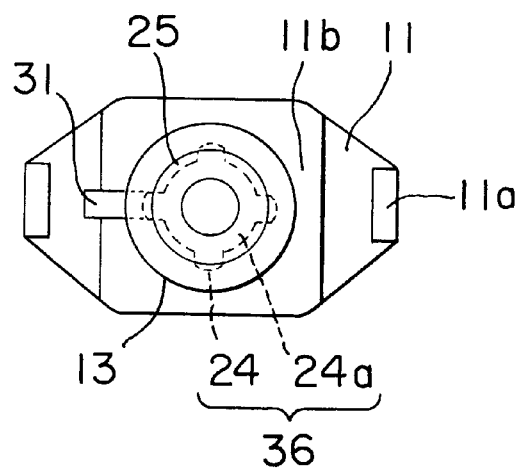
F I G. 23

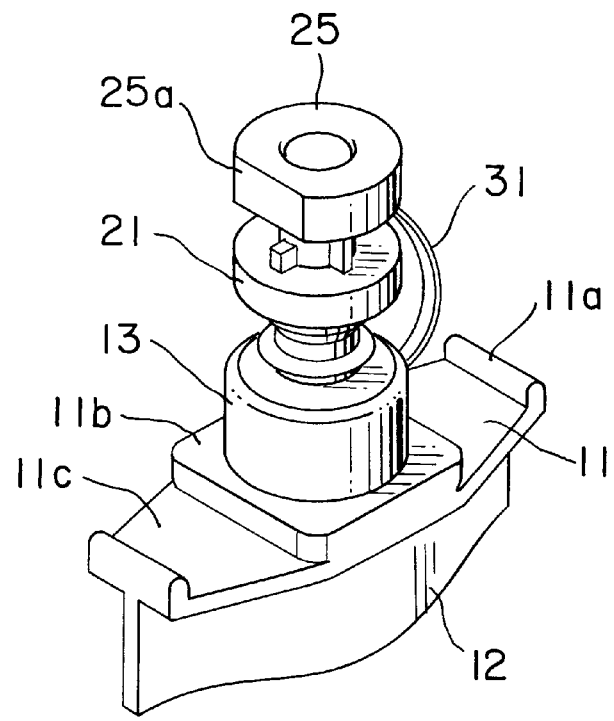
FIG. 26
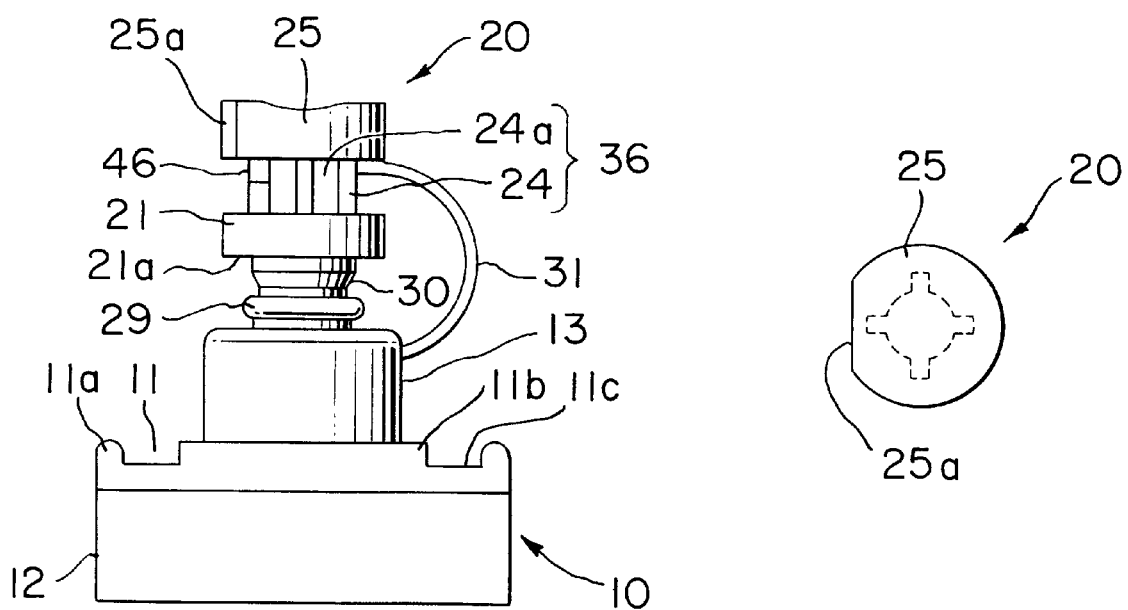
FIG. 27
FIG. 28

SPOUT ASSEMBLY, SPOUT ASSEMBLY MANUFACTURING APPARATUS AND PACKAGE WITH SPOUT ASSEMBLY

TECHNICAL FIELD

The present invention relates to a sanitary spout assembly having a spout and a cap, an apparatus for manufacturing a spout assembly, and a package provided with a spout assembly.

RELATED ART

Spout assemblies each having a spout to be attached to a package, and a cap to be put on the spout, formed integrally with the spout are disclosed in JP-A Nos. 5-162756 and 5-229566.

The spout assembly disclosed in JP-A No. 5-162756 has a spout to be attached to a package, and a cap for closing the spout. The cap is formed integrally with the spout in an upside-down position. The integral formation of the spout and the cap is effective in reducing the manufacturing cost of the spout assembly and enables the omission of work for putting the cap on the spout.

As mentioned above, there is a known spout assembly having a spout and a cap formed integrally with the spout. In this known spout assembly, however, the cap is connected in an upside-down position to the spout with its inside exposed outside. Therefore, when putting the cap separated from the spout on the spout again, the inside of the cap exposed outside enters the spout, which is unsanitary. When putting the cap separated from the spout on the spout to close the spout, the cap needs to be inverted, which requires a troublesome spout closing action.

SUMMARY OF THE INVENTION

The present invention has been made in view of such problems in the prior art and it is therefore an object of the present invention to provide a sanitary spout assembly having a spout and a cap and requiring a simple spout closing action.

According to a first aspect of the present invention, a spout assembly comprises a spout having an outer tube to be placed outside a package, and a base to be attached to the inner surface of the package; and a cap separably connected to the extremity of the outer tube of the spout coaxially with the outer tube in a position in which the cap is pushed into the outer tube. The cap can be separated from the outer tube and can be pushed into the outer tube to seal the spout.

According to a second aspect of the present invention, a spout assembly manufacturing apparatus comprises an injection mold for integrally forming a spout assembly comprising a spout and a cap having a top plate by molding a resin; and a core for forming hollows in the spout and the cap. The core has a tapered upper end portion tapering toward a portion of the injection mold corresponding to the top plate, and the resin is injected into the injection mold toward the upper end portion of the core.

According to a third aspect of the present invention, a spout assembly manufacturing apparatus comprises an injection mold for integrally forming a spout assembly comprising a spout and a cap connected to the spout by a thin wall by molding a resin; and a core for forming hollows in the spout and the cap. The core has a shape to form the thin wall so that the thin wall has the least thickness in a direction in which the cap is moved to put the cap into the spout.

According to a fourth aspect of the present invention, a package with a spout assembly comprises a package; and a spout assembly comprising a spout having an outer tube to be placed outside the package, and a base to be attached to the inner surface of the package, and a cap separably connected to the extremity of the spout coaxially with the spout in a position in which the cap is pushed into the outer tube. The cap can be separated from the outer tube and can be pushed into the outer tube to seal the spout.

According to a fifth aspect of the present invention, a method of hermetically attaching a package to a spout assembly comprising a spout having a outer tube and a base, and a cap separably connected to the extremity of the outer tube of the spout coaxially with the outer tube in a position in which the cap is pushed into the outer tube to a package comprises steps of inserting the base of the spout assembly in the package; temporarily bonding the package to the base for temporary sealing; thoroughly bonding the package to the base for sealing; hermetically bonding the package to the base; and cooling the joint of the base and the package.

According to the first aspect of the present invention, the spout can be sealed by pushing the cap separated from the spout into the outer tube without changing its position to put the cap hermetically on the spout. Therefore, the inside of the cap can always be maintained in a sanitary condition and the cap can be put on the spout by a simple action.

According to the second aspect of the present invention, the core has a tapered upper end portion tapered toward a portion of the injection mold corresponding to the top plate, and the resin is injected into the injection mold toward the tapered upper end portion, so that the resin flows along the core. Accordingly, the core disposed within the injection mold is not forced to be dislocated from its correct position by the resin injected into the injection mold.

According to the third aspect of the present invention, the core has a shape to form the thin wall so that the thin wall has the least thickness in a direction in which the cap is moved to push the cap into the spout. Therefore, the least thickness of the thin wall does not change even if the core is dislocated slightly in a direction perpendicular to the direction in which the cap is moved to push the same into the spout.

According to the fourth aspect of the present invention, the cap separated from the outer tube can be pushed into the outer tube to seal the spout by pushing the same into the outer tube without changing its position to seal the spout.

According to the fifth aspect of the present invention, the base of the spout assembly can surely hermetically be bonded to the package.

BRIEF DESCRIPTION OF THE DRAWINGS

FIG. 17 is a sectional view of a connecting part included in the spout assembly of FIG. 15;

FIG. 18 is a half sectional view of a spout assembly in a fourth embodiment according to the present invention;

FIG. 22 is a partially sectional side view of the spout assembly of FIG. 21;

FIG. 23 is a plan view of the spout assembly of FIG. 21;

FIG. 26 is a perspective view of a spout assembly in an eighth embodiment according to the present invention;

FIG. 27 is a side view of the spout assembly of FIG. 26;

FIG. 28 is a plan view of the spout assembly of FIG. 26;

DETAILED DESCRIPTION OF THE INVENTION

First Embodiment

Figure 1:
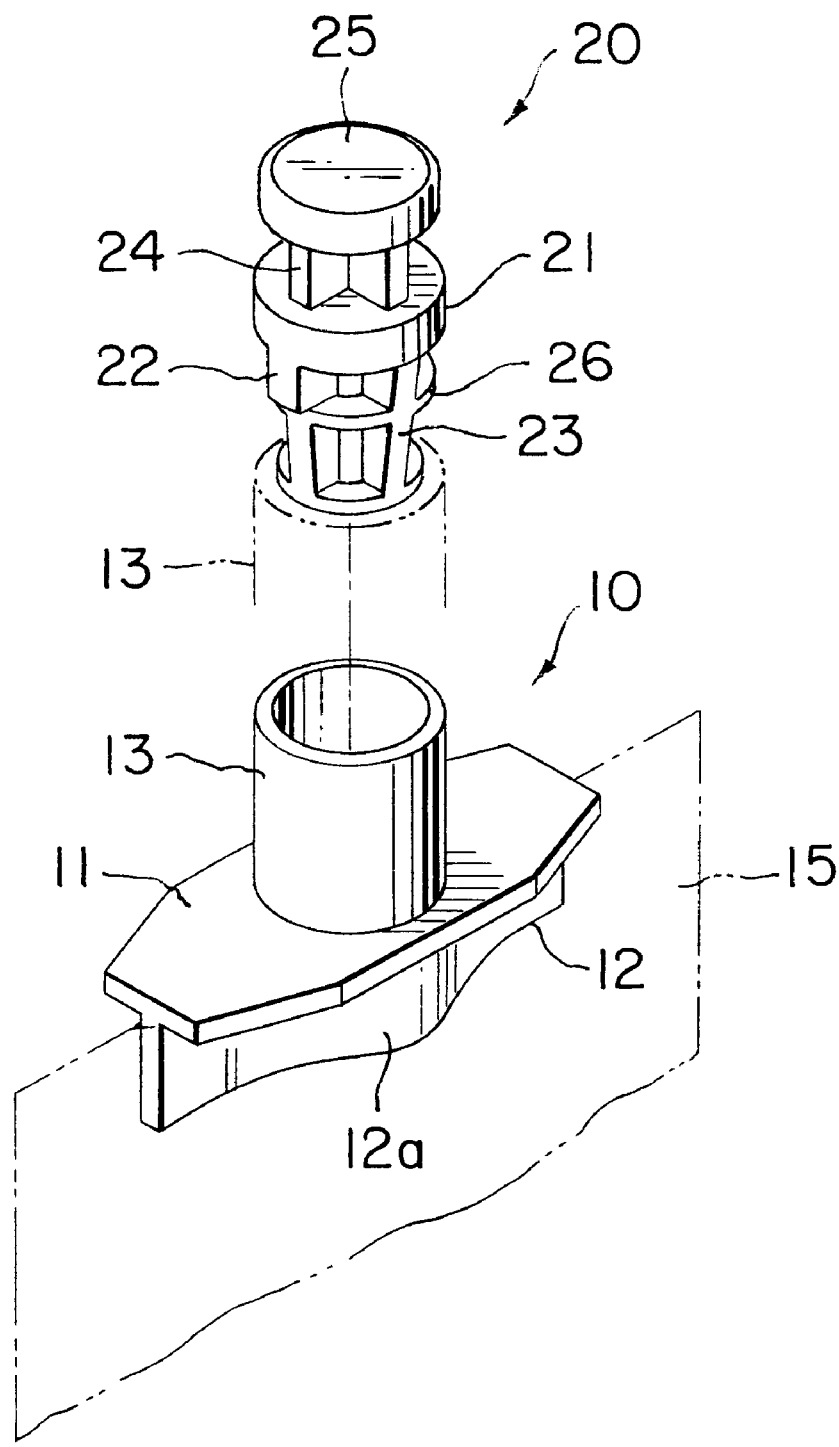
FIG. 1 is a perspective view of a spout assembly in a first embodiment according to the present invention.
Figure 2:
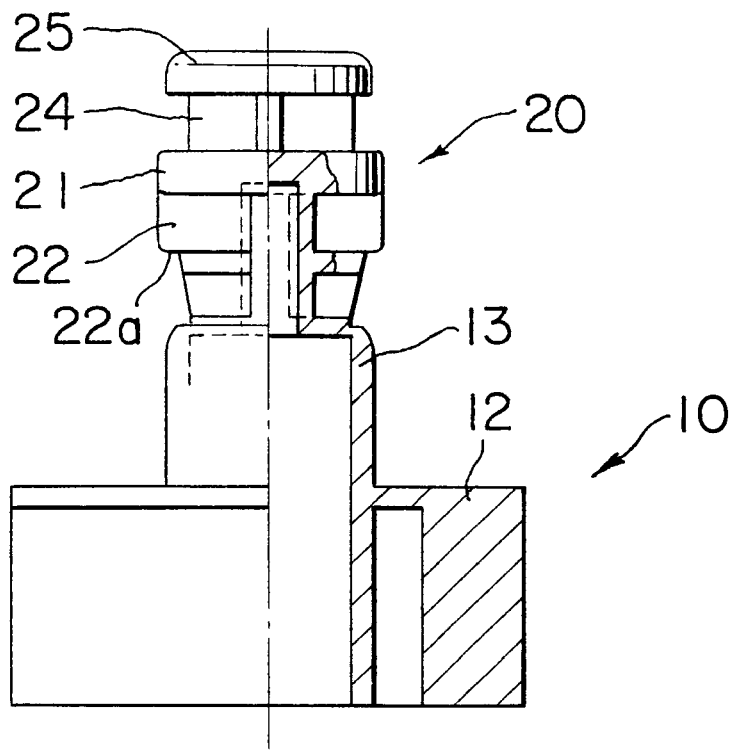
FIG. 2 is a partly sectional front view of the spout assembly of FIG. 1.

A spout assembly in a first embodiment according to the present invention will be described with reference to FIGS. 1 to 5.

Referring to FIGS. 1 to 5, a spout assembly comprises a spout 10 to be fixed to a plastic package 15, and a cap 20 separably connected to the spout 10. The spout 10 and the cap 20 are formed by molding a plastic material in a monolithic structure.

The spout 10 has an elongate flange 11 to be seated on an open edge of the package 15, and a cylindrical outer tube 13 which extends outside the package 15. A circular protrusion 17 is formed on an inner circumference of the outer tube 13.

Figure 3:
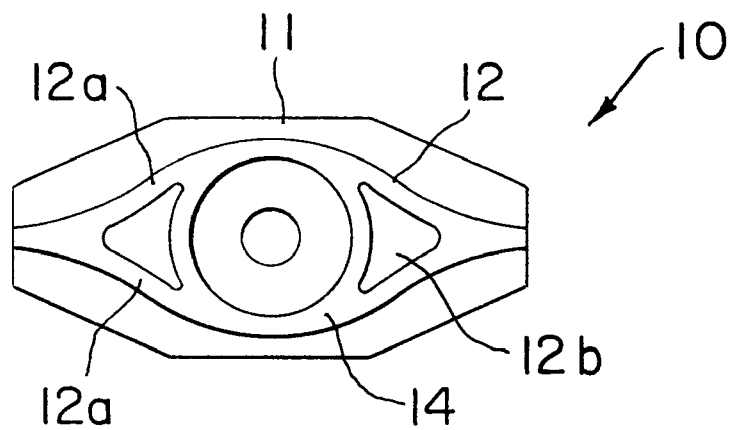
FIG. 3 is a fragmentary bottom view of the spout assembly of FIG. 1.

As shown in FIG. 3, the flange 11 is provided on its inner surface with a base 12 to be attached to the inner surface of the package 15. The base 12 is formed by combining a pair of attaching plates 12a. The pair of attaching plates 12a are curved so that the middle portion of the base 12 is expanded. The pair of attaching plates 12a are bonded to the inner surface of the package 15 to attach the base 12 to the inner surface of the package 15. Hollows 12b are formed between the pair of attaching plates 12a at positions near the opposite ends of the attaching plates 12a to prevent the occurrence of shrinkage cavities when molding the spout assembly.

An inner tube 14 is formed in the base 12 so as to be connected to the outer tube 13.

Figure 4:
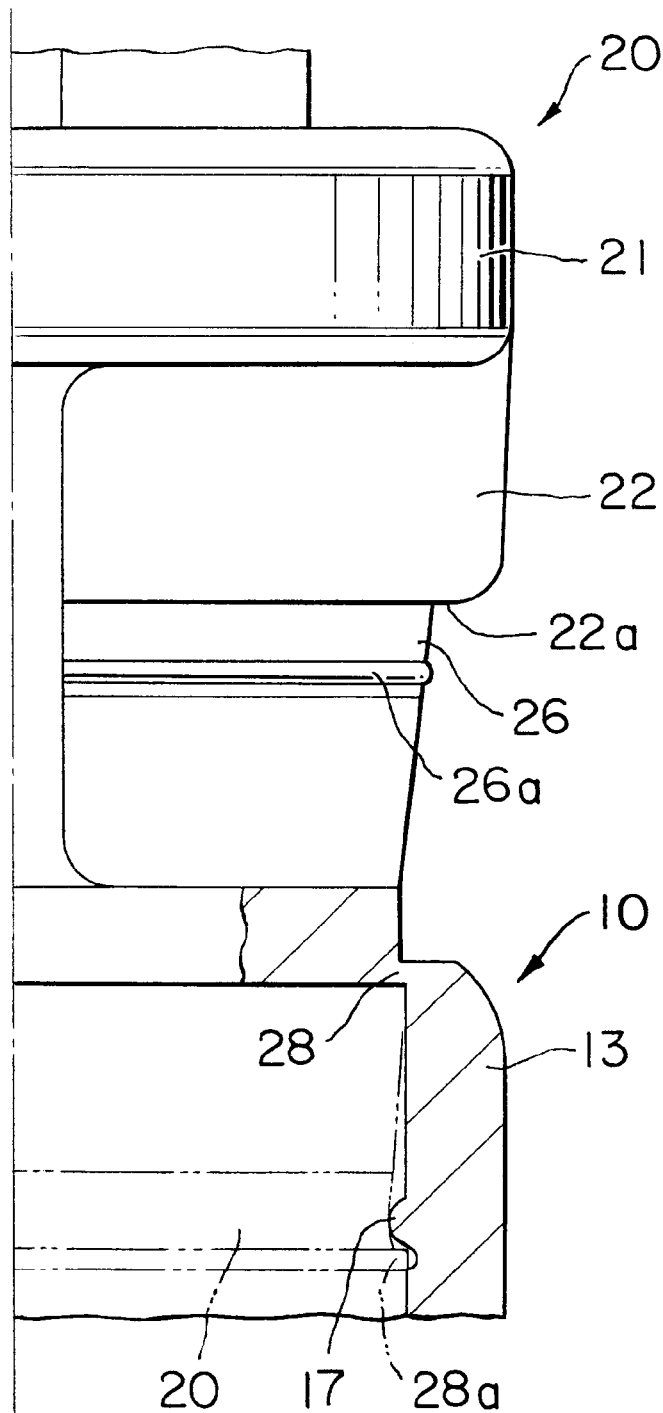
FIG. 4 is an enlarged half sectional view of the spout assembly of FIG. 1.

As shown in FIG. 4, the cap 20 is connected separably to an end of the cylindrical outer tube 13 of the spout 10 in a position where the cap is directed in a cap pushing direction. The cap 20 is connected to the cylindrical outer tube 13 by a thin wall 28. The cap 20 can easily be separated from the cylindrical outer tube 13 by breaking the thin wall 28.

The cap 20 has a tubular middle part 21, and a top plate 25 connected to an outer end (upper end as viewed in FIG. 1) by a rib 24 of an X-shaped cross section. The rib 24, as compared with a solid column, is more effective in preventing the formation of shrinkage cavities when molding the spout assembly. A pair of legs 22 extend inward (downward as viewed in FIG. 1) from diametrically opposite positions on the middle part 21. Steps 22a are formed at the lower ends of the pair of legs 22, respectively. The steps 22a rest on the upper end of the cylindrical outer tube 13 and a broken fin 28a formed on the cap 20 rides over and engages with the circular protrusion 17 when the cap 20 is pushed in the cylindrical outer tube 13.

A pair of inclined ribs 23 are formed diametrically opposite to each other on the middle part 21 so as to extend inward (downward as viewed in FIG. 1) so that the legs 22 and the inclined ribs 23 are arranged at equal angular intervals of 90°.

A horizontal ring 26 is connected to the lower ends of the legs 22 in parallel to the flange 11 (horizontally as viewed in FIG. 1), and a circumferential rib 26a protrudes from the outer surfaces of the horizontal ring 26.

The operation of the spout assembly thus formed will be explained hereinafter.

First, the spout assembly is attached to the open edge of the flexible package 15 by bonding the pair of attaching plates 12a of the base 12 to the inner surface of the package 15 to attach the base 12 to the inner surface of the package 15. In this state, the cap 20 is connected to the cylindrical outer tube 13 of the spout 10.

Then, the spout 10 is held firmly and the cap 20 is tilted to break the thin wall 28 so that the cap 20 is separated from the cylindrical outer tube 13 and then the cap 20 is pushed into the cylindrical outer tube 13 without changing the position as far as the steps 22a of the pair of legs 22 is seated on the upper end of the cylindrical outer tube 13, whereby the cylindrical outer tube 13 is shut tight. When the cap 20 is thus pushed into the cylindrical outer tube 13, the broken fin 28a of the cap 20 rides over and engages with the circumferential protrusion 17. In this state, the circumferential rib 26a is in close contact with the inner surface of the cylindrical outer tube 13 for sealing. The cap 20 can firmly be fastened to the cylindrical outer tube 13 by firmly pressing the steps 22a against the outer end of the cylindrical outer tube 13 by the fin 28a in engagement with the circumferential protrusion 17.

Since the spout 10 and the cap 20 of the spout assembly are thus formed in a monolithic structure, the spout assembly can be manufactured at a low cost and does not require any work for putting the cap 20 on the spout 10. Since the cap 20 is connected to the outer end of the cylindrical outer tube 13 in a position directed in the cap pushing direction, the inside of the cap 20 is not exposed outside. Since the cap 20 is connected to the cylindrical outer tube 13 with its inside facing the interior of the outer tube 13, the cap can always be maintained in a sanitary state. Thus, the cap 20 can easily be put on the cylindrical outer tube 13 simply by pushing the cap 20 into the cylindrical outer tube 13 without inverted the position after separating the same from the cylindrical outer tube 13.

Figure 5:
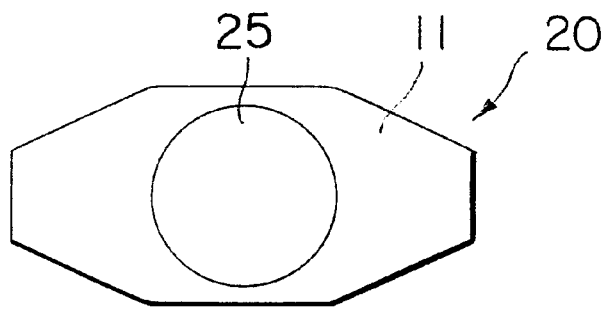
FIG. 5 is a plan view of the spout assembly of FIG. 1.
Figure 6:
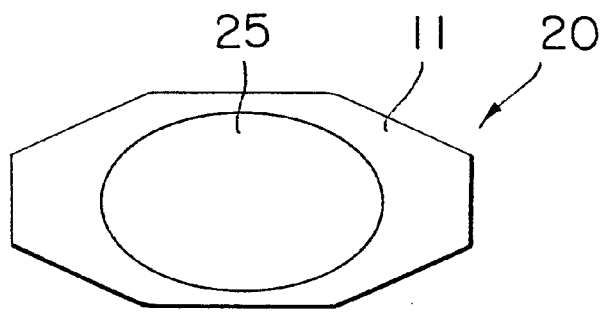
FIG. 6 is a plan view of a spout assembly in a modification of the spout assembly of FIG. 1.
Figure 7:
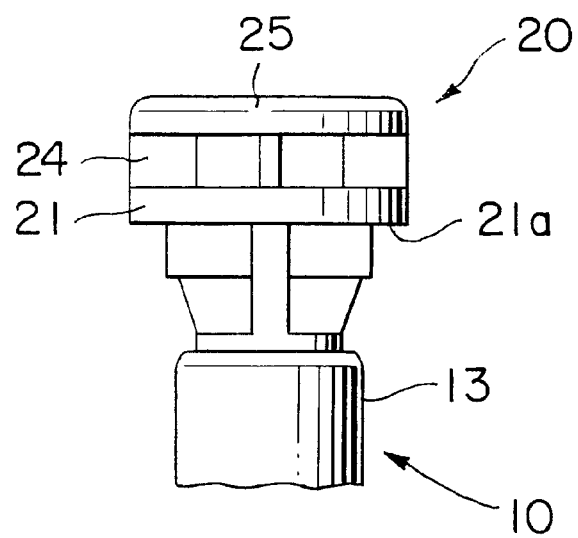
FIG. 7 is a side view of the spout assembly of FIG. 6.
Figure 8:
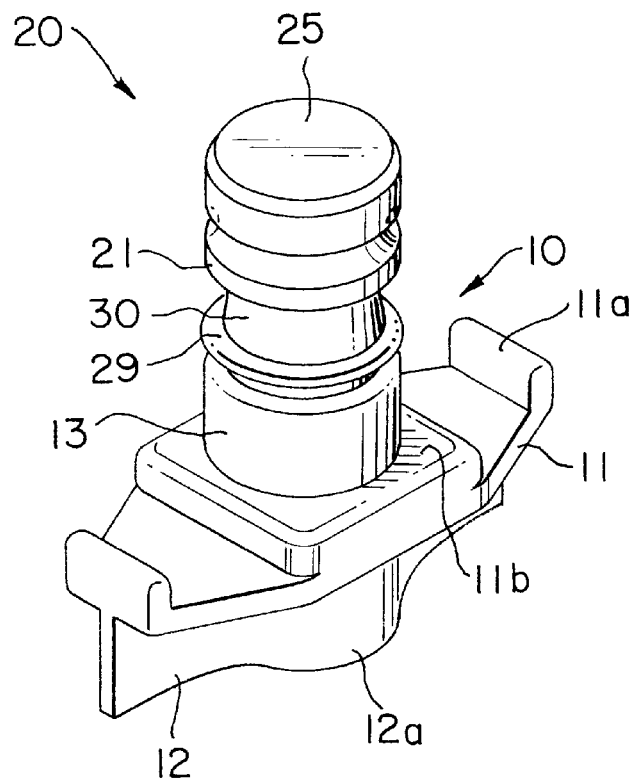
FIG. 8 is a perspective view of a spout assembly in a second embodiment according to the present invention.

Although this embodiment employs the cap 20 having a circular planar shape as shown in FIG. 5, a cap 20 having an oval planar shape as shown in FIG. 6 and 7 may be used instead of the cap 20 having a circular planar shape. When the cap 20 shown in FIGS. 6 and 7 is used, an outer tube having an oval cross section corresponding to that of the cap 20 is used instead of the cylindrical outer tube 13 having a circular cross section. A cap 20 having a square planar shape and an outer tube having a square cross section may be used.

The cap 20 shown in FIGS. 6 and 7 has a middle part 21 having a step 21a which rests on the end surface of the outer tube 13 of the spout 10.

Second Embodiment

A spout assembly in a second embodiment according to the present invention will be described with reference to FIGS. 8 to 14, in which parts like or corresponding to those of the first embodiment shown in FIGS. 1 to 7 are designated by the same reference numerals and the detailed description thereof will be omitted.

Referring to FIGS. 8 to 11, a spout 10 has a flange 11, and an cylindrical outer tube 13 connected to the flange 11 and extending outside a package like that shown in FIG. 1. The flange 11 has the shape of a thin plate and is provided with projections 11a at its opposite ends, respectively, and a support pad 11b of an increased thickness for supporting the cylindrical outer tube 13 in the middle portion thereof. The respective edges of the projections 11a and the support pad 11b are rounded.

The projections 11a and the support pad 11b of the flange 11 have the same height, so that, when carrying the spout assembly by a carrying device, not shown, the spout assembly can stably hold with the projections 11a and the support pad 11b in contact with the carrying device.

The side edges of the projections 11a and the support pad 11b are straight. Therefore, when carrying a plurality of spout assemblies in an inverted position, the adjacent spout assemblies can be arranged in close contact with each other for efficient carrying.

Figure 11:
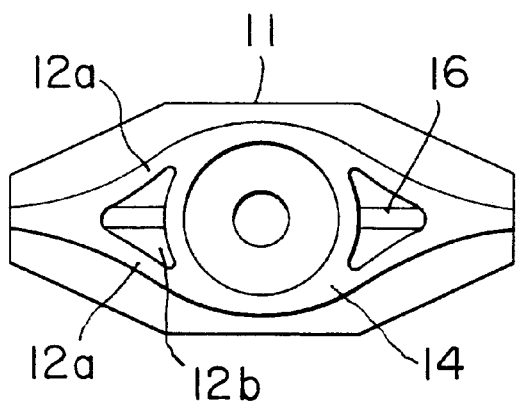
FIG. 11 is a bottom view of the spout assembly of FIG. 8.

The flange 11 is provided with a base 12 to be bonded to the inner surface of the package 15. The base 12 has a pair of attaching plates 12a and a cylindrical inner tube 14 formed between the pair of attaching plates 12a so as to be connected to the cylindrical outer tube 13. The pair of attaching plates 12a are curved so that the middle portion of the base 12 is expanded. A pair of ribs 16 extend substantially in parallel to the pair of attaching plates 12a between the opposite ends of the pair of attaching plates 12a and the cylindrical inner tube 14 as shown in FIG. 11.

The pair of attaching plates 12a are bonded to the inner surface of the package 15 by heat sealing. When heat sealing the package 15 to the pair of attaching plates 12a, pressure is applied to the pair of attaching parts 12a in a direction to flatten the pair of attaching plates 12a. However, the great deformation of the pair of attaching plates 12a in the flattening direction is prevented by the pair of ribs 16. Therefore, the pair of attaching plates 12a can surely and highly hermetically be bonded to the inner surface of the package 15. Even if the pair of attaching plates 12a are deformed in the flattening direction, the pair of attaching plates 12 can be restored to their original shapes by the agency of the pair of ribs 16.

A cap 20 is connected to the cylindrical outer tube 13 of the spout 10 by a thin wall 28. The cap 20 can easily be separated from the cylindrical outer tube 13 by breaking the thin wall 28.

Figure 9:
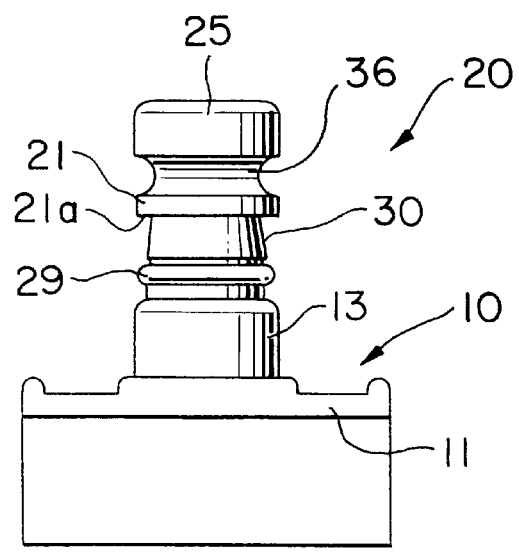
FIG. 9 is a side view of the spout assembly of FIG. 8.

As shown in FIG. 9, the cap 20 has a tubular middle part 21, a top plate 25 connected to an upper end by a connecting part 36, and a plugging part 30 extending from the middle part 21 toward the cylindrical outer tube 13. A circumferential circular protrusion 29 is formed on a circumference of the lower end of the plugging part 30. When the cap 20 is pushed into the cylindrical outer tube 13, the circular protrusion 29 comes into close contact with the inner circumference of the cylindrical outer tube 13.

A step 21a is formed at the lower end of the tubular middle part 21 of the cap 20. When the cap 20 is pushed into the cylindrical outer tube 13, the step 21a is seated on the upper end of the cylindrical outer tube 13, and the circular protrusion 29 come into contact with the inner circumference of the cylindrical outer tube 13.

The operation of the spout assembly thus formed will be explained hereinafter.

Figure 10A:
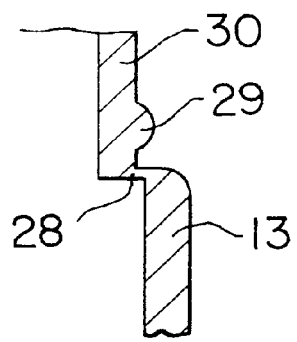
FIG. 10A is a fragmentary sectional view of the spout assembly of FIG. 8.
Figure 10B:
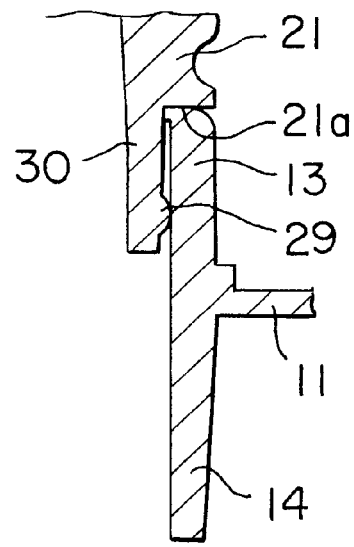
FIG. 10B is a fragmentary sectional view of the spout assembly of FIG. 8.

First, the spout assembly is attached to the open edge of the package 15 by bonding the pair of attaching plates 12a of the base 12 to the inner surface of the package 15 by heat sealing to attach the base 12 to the inner surface of the package 15. Since the pair of ribs 16 are formed between the pair of attaching plates 12a, the pair of attaching plates 12a are not greatly deformed in the flattening direction, and hence the pair of attaching plates 12a can highly hermetically be bonded to the package 15. Even if the pair of attaching plates 12a are deformed in the flattening direction, the pair of attaching plates 12 can be restored to their original shapes by the agency of the pair of ribs 16. Then, the spout 10 is held firmly and the cap 20 is separated from the cylindrical outer tube 13 by breaking the thin wall 28 (FIG. 10A).

Figure 16A:
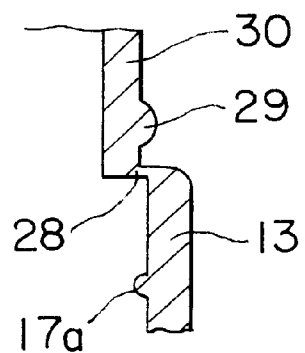
FIG. 16A is a fragmentary sectional view of the spout assembly of FIG. 15.
Figure 16B:
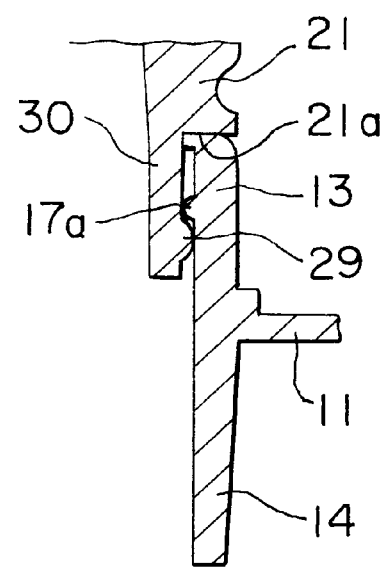
FIG. 16B is a fragmentary sectional view of the spout assembly of FIG. 15.

Then, the cap 20 is pushed into the cylindrical outer tube 13 without changing the position as far as the flange 21a of the cap 20 is seated on the upper end of the cylindrical outer tube 13 (FIG. 10B), whereby the cylindrical outer tube 13 is shut tight by the cap 20. When the cap 20 is thus pushed into the cylindrical outer tube 13, the circular protrusion 29 formed at the lower end of the plugging part 30 of the cap 20 come into close contact with the inner circumference of the cylindrical outer tube 13 for sealing. An additional circular protrusion 17a may be formed on the inner circumference of the cylindrical outer tube 13, and the circular protrusion 29 may ride over the circular protrusion 17a when the cap 20 is pushed deep into the cylindrical outer tube 13 as shown in FIGS. 16A and 16B. The engagement of the circular protrusions 17a and 29 further enhances the effect of sealing the space between the cap 20 and the cylindrical outer tube 13.

A spout assembly in a modification of the foregoing spout assembly will be described with reference to FIGS. 12 and 13. In the spout assembly shown in FIGS. 12 and 13, the middle part 21 of the cap 20 and the cylindrical outer tube 13 of the spout 10 are interconnected by an elastic strip 31. The spout assembly shown in FIGS. 12 and 13 is substantially the same in other respects as the spout assembly shown in FIGS. 8 to 11.

Figure 12:
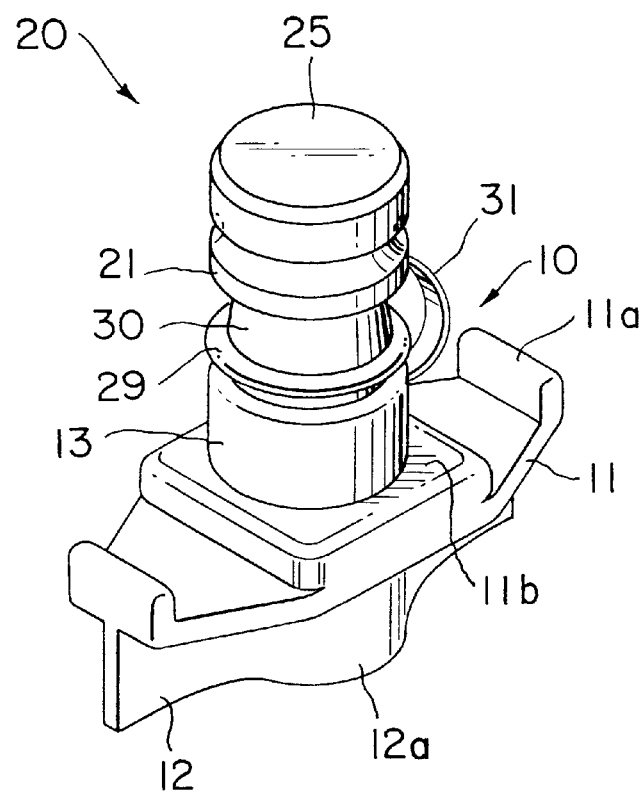
FIG. 12 is a spout assembly in a modification of the spout assembly of FIG. 8.
Figure 13:
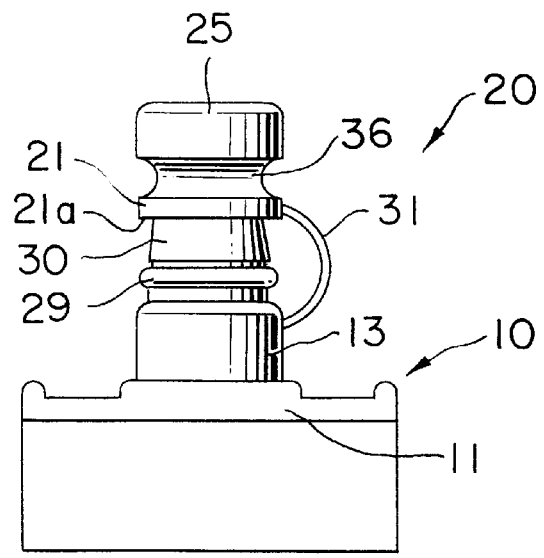
FIG. 13 is a side view of the spout assembly of FIG. 12.

Since the cap 20 and the spout 10 are interconnected by the elastic strip 31 as shown in FIGS. 12 and 13, the cap 20 is unable to separate from the spout 10, will not be lost and will not fall down and contaminated with dust when the cap 20 is removed from the spout 10.

A spout assembly in another modification of the foregoing spout assembly will be described with reference to FIGS. 14A and 14B. In the spout assembly shown in FIGS. 14A and 14B, the plugging part 30 of the cap 20 is provided with an external thread 33, and the cylindrical outer tube 13 of the spout 10 is provided with an internal thread 35 mating with the external thread 33. The spout assembly shown in FIGS. 14A and 14B is substantially the same in other respects as the spout assembly shown in FIGS. 8 to 11.

Figure 14A:
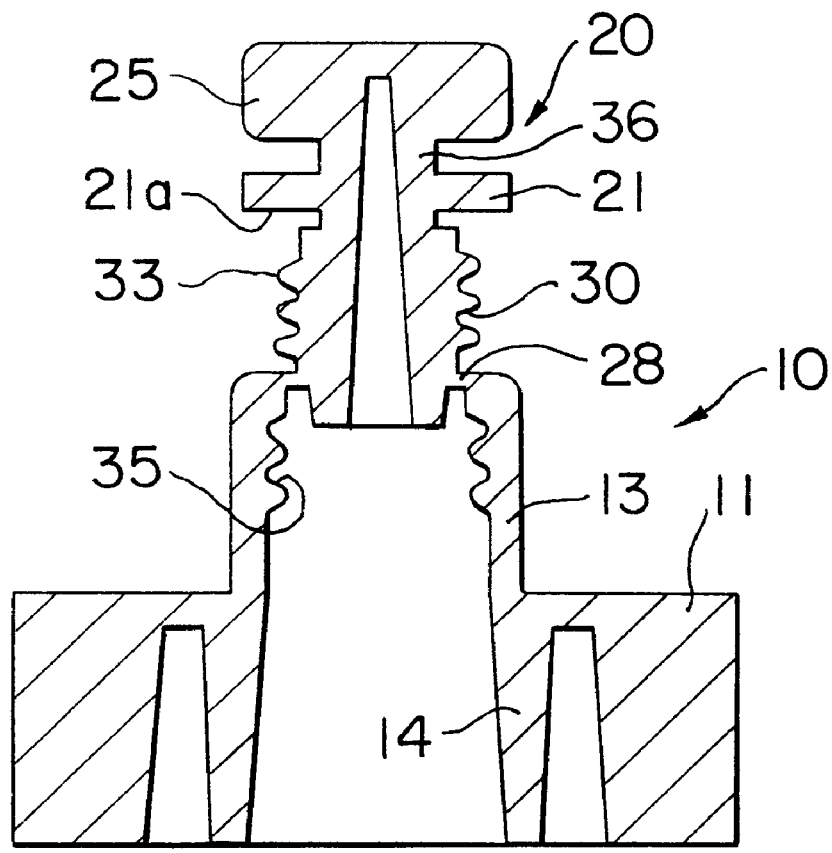
FIG. 14A is a longitudinal sectional view of a spout assembly in another modification of the spout assembly of FIG. 8.
Figure 14B:
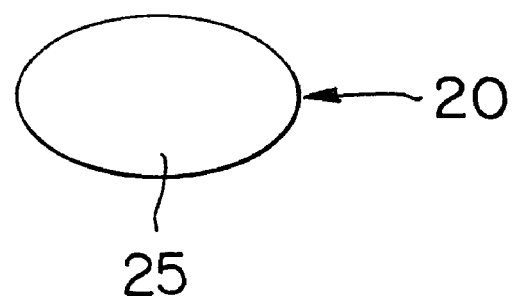
FIG. 14B is a plan view of the spout assembly of FIG. 14A.

Referring to FIGS. 14A and 14B, the cap 20 has a cylindrical middle part 21, an oval top plate 25 connected to the upper end of the cylindrical middle part 21 by a connecting part 36, and the plugging part 30 extending from the lower end of the middle part 21 to the cylindrical outer tube 13. The plugging part 30 is provided with the external thread 33, and the cylindrical outer tube 13 of the spout 10 is provided with the internal thread 35 mating with the external thread 33 of the plugging part 30.

As shown in FIGS. 14A and 14B, the cap 20 is turned to break a thin wall 28 to disconnect the cap 20 from the cylindrical outer tube 13, and then the cap 20 is turned to screw the cap 20 into the cylindrical outer tube 13 so that the cylindrical outer tube 13 is shut tight.

Third Embodiment

A spout assembly in a third embodiment according to the present invention will be described with reference to FIGS. 15 to 17, in which parts like or corresponding to those of the second embodiment shown in FIGS. 8 to 14 are designated by the same reference numerals and the detailed description thereof will be omitted. In the spout assembly shown in FIGS. 15 to 17, only a connecting part 36 connecting a cylindrical middle part 21 and a top plate 25 is different from that in the second embodiment, and the spout assembly shown in FIGS. 15 to 17 is substantially the same in other respects as the spout assembly shown in FIGS. 8 to 14.

Figure 15:
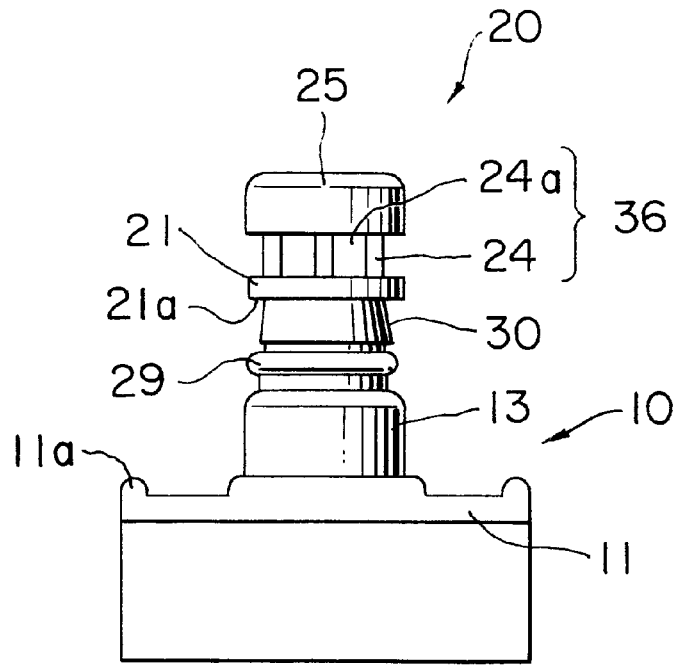
FIG. 15 is a side view of a spout assembly in a third embodiment according to the present invention.

Referring to FIGS. 15 to 17, a cap 20 has the cylindrical middle part 21, and the top plate 25 connected by the connecting part 36 to the cylindrical middle part 21. As shown in FIG. 17, the connecting part 36 has a cylindrical body portion 24a and axial ribs 24 arranged at equal angular intervals on and radially protruding from the circumference of the body portion 24a. Since the connecting part 36 has the axial ribs 24 radially protruding from the circumference of the body portion 24a, the connecting part 36 has a high strength for the quantity of its material, and the axial ribs 24 prevents the formation of shrinkage cavities when molding the spout assembly.

As mentioned above, a cylindrical outer tube 13 of the spout 10 is provided with an additional circumferential circular protrusion 17a as shown in FIGS. 16A and 16B. When the cap 20 is pushed into the spout 10, a circumferential circular protrusion 29 formed at the lower end of a plugging part 30 rides over and engages with the circular protrusion 17a. Since the height of the additional circular protrusion 17a is smaller than that of the circular protrusion 17 shown in FIG. 4, and hence the cap 20 can easily be pushed in and removed from the spout 10. As shown in FIG. 15, the plugging part 30 is tapered slightly toward the middle part 21. When the cap 20 is pushed into the cylindrical outer tube 13, the circular protrusion 29 pushes the cylindrical outer tube 13 radially outward and thereby the inner circumference of the cylindrical outer tube 13 is tapered upward. However, since the plugging part 30 is tapered upward, the plugging part 30 fits the tapered inner circumference of the cylindrical outer tube 13 closely.

Fourth Embodiment

A spout assembly in a fourth embodiment according to the present invention will be described hereinafter. FIG. 18 is a sectional view of the spout assembly in the fourth embodiment. The spout assembly shown in FIG. 18 differs from the spout assembly in the third embodiment shown in FIGS. 15 to 17 only in the shape of a thin wall 28 and substantially the same as that shown in FIGS. 15 and 17 in other respects. Therefore, parts shown in FIG. 18 like or corresponding to those of the third embodiment shown in FIGS. 15 to 17 are designated by the same reference numerals and the detailed description thereof will be omitted.

Referring to FIG. 18, the spout assembly comprises a spout 10 having a flange 11 and a cylindrical outer tube 13. Projections 11a are formed at the opposite ends of the flange 11. A cylindrical inner tube 14 and an inner attaching parts 12 consisting of a pair of attaching plates 12a are connected to the lower end of the flange 11. A cap 20 is connected to the cylindrical outer tube 13 of the spout 10 by a thin wall 28 so as to extend in an axial direction indicated by the arrow L.

The cap 20 has a cylindrical middle part 21 forming a step 21a by its lower end surface. When the cap 20 is pushed into the cylindrical outer tube 13, the step 21a is seated on the upper end of the cylindrical outer tube 13, and a circumferential circular protrusion 29 comes into contact with the inner circumference of the cylindrical outer tube 13.

The spout assembly having, in combination, the spout 10 and the cap 20 is formed in a monolithic structure by injection molding using an injection mold 40 as shown in FIG. 18. The injection mold 40 is provided with a gate 42 in a portion thereof substantially just above the top plate 25. A core 41 is placed in a cavity in the injection mold 40 to form hollows in the spout 10 and the cap 20.

An upper end portion 41a of the core 41 is tapered toward the top plate 25, i.e., toward the gate 42, and corresponds to the gate 42. A space between the injection mold 40 and the core 41 for forming the thin wall 28 interconnecting the spout 10 and the cap 20 has the least thickness in the direction of the arrow L in which the spout 10 and the cap 20 are connected to each other.

Referring to FIG. 18, a resin injected through the gate 42 into the injection mold 40 flows into a cavity defined by the injection mold 40 and the core 41. Since the upper end portion 41a of the core 41 is located just below the gate 42 and tapered toward the gate 42, the resin injected through the gate 42 into the injection mold 40 is able to flow smoothly downward. Therefore, the core 41 is not dislocated transversely, i.e., in a direction perpendicular to the direction of the arrow L, by the resin injected through the gate 42 into the injection mold 40, and thereby the spout assembly can be molded in a high molding accuracy. Thus, the spout assembly having the spout 10 and the cap 20 can be molded by injection molding, and the hollows defined by the core 41 is formed in the spout 10 and the cap 20. An upper end of a section of the hollow in the cap 20 corresponding to the tapered upper end portion 41a of the core 41 is tapered toward the top plate 25.

Since the thin wall 28 interconnecting the spout 10 and the cap 20 has the least thickness in the direction in which the spout 10 and the cap 20 are connected to each other, i.e., the direction of the arrow L, the least thickness of the thin wall 28 does not change even if the core 41 is dislocated in a direction perpendicular to the direction of the arrow L by the resin injected into the injection mold 40.

A spout assembly in a modification of the spout assembly in the third embodiment will be described with reference to FIG. 19. The spout assembly shown in FIG. 19 differs from the spout assembly only in that the outer surface of a portion of a cap 20 above a circumferential circular protrusion 29 is satin finished and is substantially the same in other respects as the spout assembly in shown in FIGS. 15 to 17. Therefore, parts like or corresponding to those of the third embodiment shown in FIGS. 15 to 17 are designated by the same reference numerals and the description thereof will be omitted.

Figure 19:
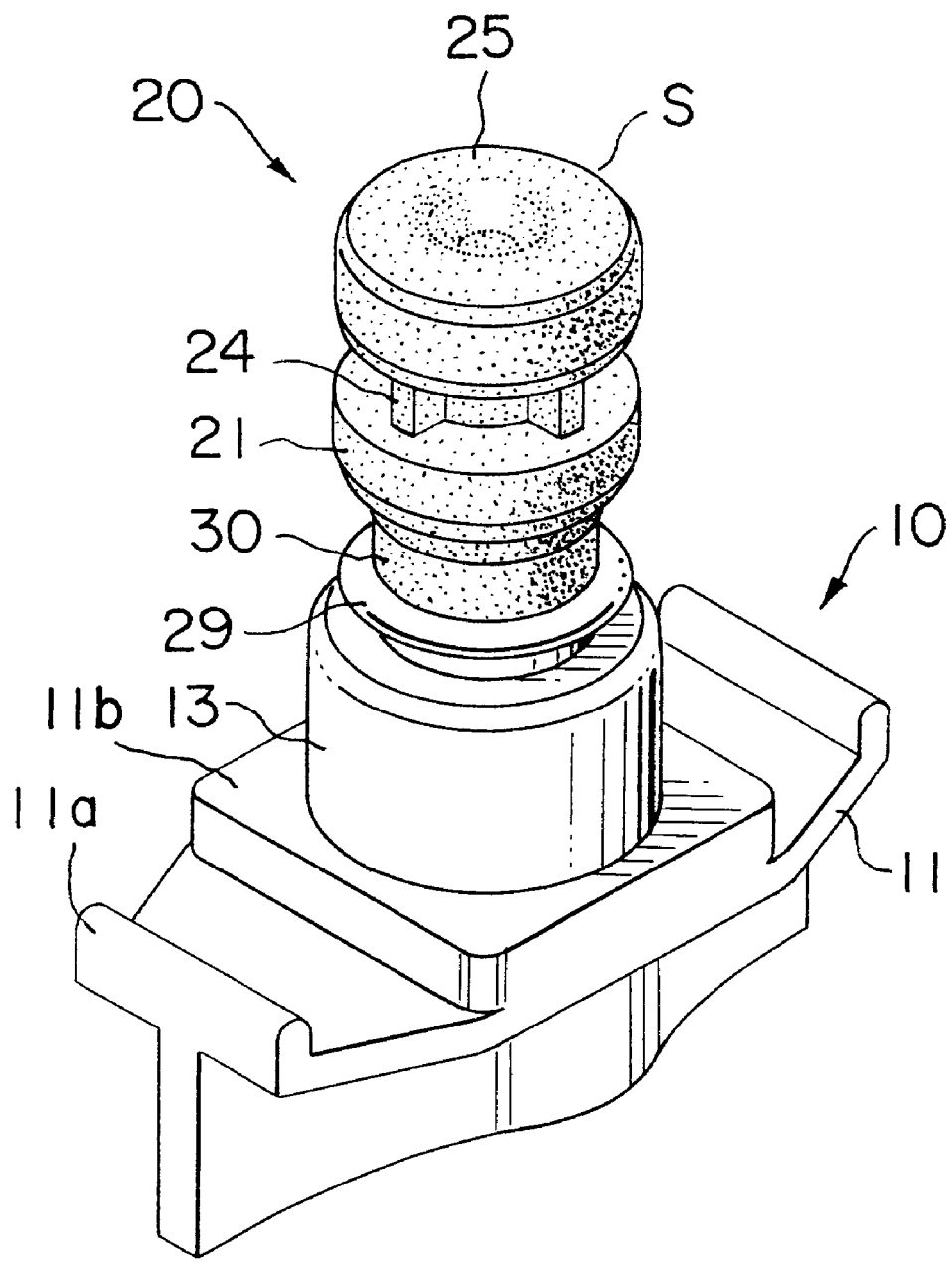
FIG. 19 is a perspective view of a spout assembly in a modification of the spout assembly of FIG. 18.

Referring to FIG. 19, the spout assembly has a spout 10 having a flange 11 and a cylindrical outer tube 13 connected to the flange 11. The flange 11 is provided at its opposite ends with projections 11a. The cap 20 is connected to the cylindrical outer tube 13 of the spout 10.

The cap 20 has a cylindrical middle part 21, a top plate 25 connected by a connecting part 24 to the upper end of the cylindrical middle part 21, and a plugging part 30 projecting from the middle part 21 toward the cylindrical outer tube 13. A circumferential circular protrusion 29 is formed on the outer circumference of the lower end portion of the plugging part 30. The circular protrusion 29 comes into contact with the inner circumference of the cylindrical outer tube 13 when the cap 20 is pushed into the cylindrical outer tube 13.

The entire outer surface S of the cap 20 is satin-finished to enable the firm grip of the cap 20.

The satin-finished outer surface S of the cap 20 facilitates the recognition of a thin wall 28 extending between the spout 10 and the cap 20. Since the spout 10 and the cap 20 are formed by molding in a monolithic structure, it is difficult to find a portion where the spout 10 and the cap 20 are to be separated. The satin-finished outer surface S of the cap 20 enables the thin wall 28 to be found easily even in a poorly illuminated environment.

The entire outer surface of the spout 10 may be satin-finished instead of the entire surface of the cap 20 to facilitate the recognition of the thin wall 28. It is also possible to satin-finish both the outer surfaces of the spout 10 and the cap 20 to enable the firm grip of the spout 10 and the cap 20.

In any of those cases, it is preferable not to satin-finish the surface of the circular protrusion 29 to avoid the deterioration of the sealing performance of the circular protrusion 29 when the cap 20 is pushed into the spout 10 for closing (reclosing).

Ideas incorporated into the fourth embodiment shown in FIGS. 18 and 19 may be used in combination with those incorporated into the first embodiment shown in FIGS. 1 to 7, the second embodiment shown in FIGS. 8 to 14 and the third embodiment shown in FIGS. 15 to 17. For instance, in the fourth embodiment shown in FIG. 19, the cylindrical outer tube 13 of the spout, and the cylindrical middle part 21 of the cap 20 may be interconnected by an elastic strip 31 like that shown in FIGS. 12 and 13. When the cap 20 and the spout 10 are interconnected by the elastic strip 31, the cap 20 is unable to separate from the spout 10, will not be lost and will not fall down and contaminated with dust when the cap 20 is removed from the spout 10.

Fifth Embodiment

A spout assembly in a fifth embodiment according to the present invention will be described hereinafter with reference to FIG. 20.

Figure 20:
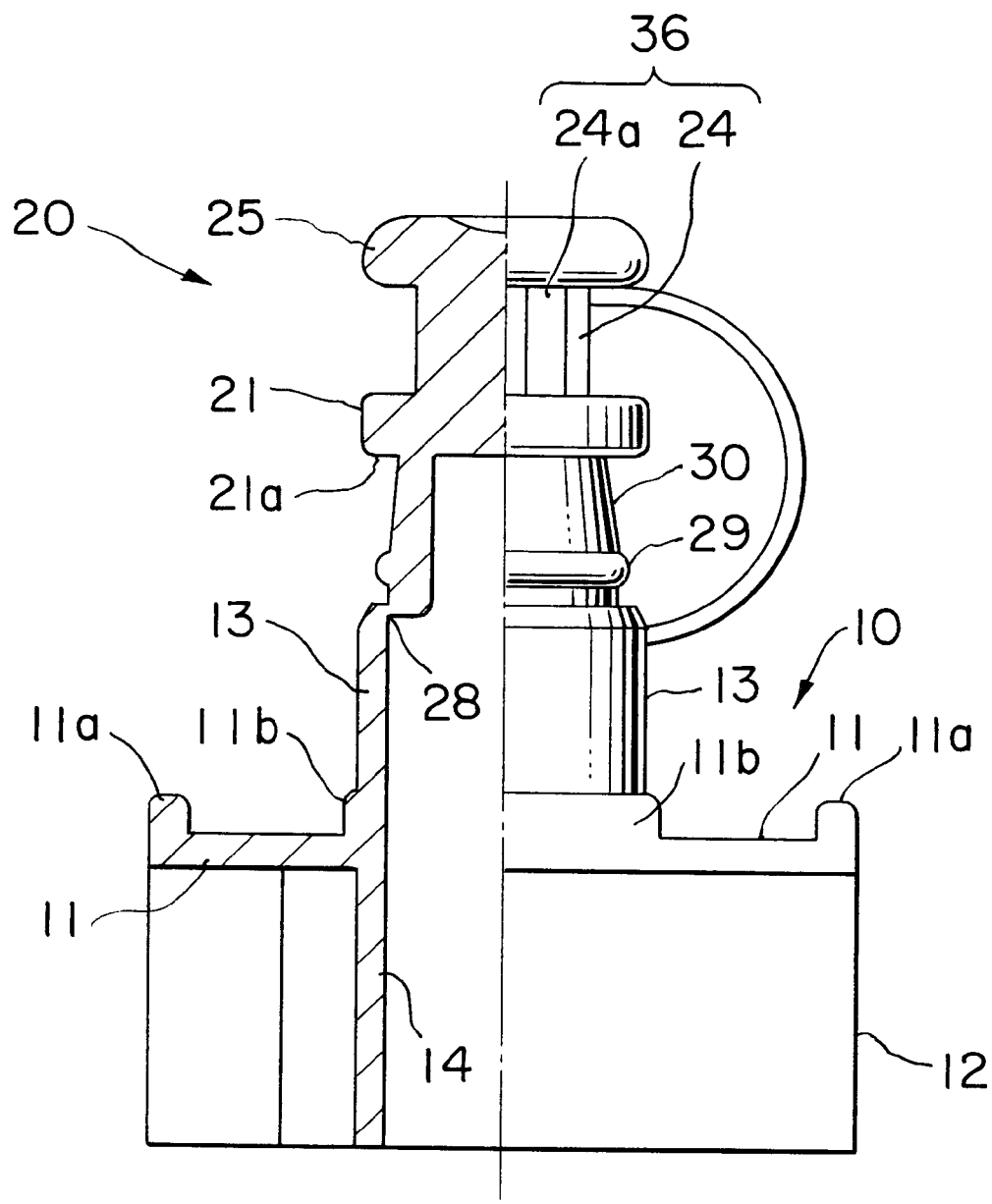
FIG. 20 is a partially sectional view of a spout assembly in a fifth embodiment according to the present invention.

As shown in FIG. 20, in the spout assembly in the fifth embodiment, a connecting strip 36 is extended between an upper portion of a cylindrical outer tube 13 of a spout 10, and an upper portion of a connecting part 36 of a cap 20 to interconnect the spout 10 and the cap 20. The spout assembly in the fifth embodiment is substantially the same in other respects as the spout assembly in the third embodiment shown in FIGS. 15 to 17. Therefore, parts shown in FIG. 20 like or corresponding to those of the third embodiment shown in FIGS. 15 to 17 are designated by the same reference numerals and the detailed description thereof will be omitted.

Referring to FIG. 20, the spout assembly has spout 10 having a flange 11 and a cylindrical outer tube 13 connected to the flange 11. The flange 11 is provided at its opposite ends with projections 11a. A cylindrical inner tube 14 and a base 12 are formed on the lower surface of the flange 11. A thin wall 28 is extended between the cylindrical outer tube 13 of the spout 10 and a cap 20 to connect the cap 20 to the spout 10.

The cap 20 has a cylindrical middle part 21, a top plate 25 connected to the middle part 21 by a connecting part 36, and a plugging part 30 projecting from the middle part 21 toward the cylindrical outer tube 13. A circumferential circular protrusion 29 is formed on the outer surface of the lower end portion of the plugging part 30. The circular protrusion 29 comes into close contact with the inner circumference of the cylindrical outer tube 13 when the cap 20 is pushed into the cylindrical outer tube 13.

An elastic strip 31 is extended between the cylindrical outer tube 13 of the spout 10, and an upper portion of the connecting part 36 of the cap 20. Since the cap 20 is thus connected by the elastic strip 31 to the spout 10, the cap 20 is unable to separate from the spout 10, will not be lost and will not fall down and contaminated with dust when the cap 20 is removed from the spout 10.

Sixth Embodiment

A spout assembly in a sixth embodiment according to the present invention will be described with reference to FIGS. 21 to 23. The spout assembly in the sixth embodiment has a strip 31 interconnecting an upper portion of a cylindrical outer tube 13 included in a spout 10, and an upper portion of a connecting part 36 included in a cap 20. The sixth embodiment is substantially the same in other respects as the fourth embodiment shown in FIG. 18. Therefore, parts like or corresponding to those of the fourth embodiment shown in FIG. 18 are designated by the same reference numerals and the detailed description thereof will be omitted.

Figure 21:
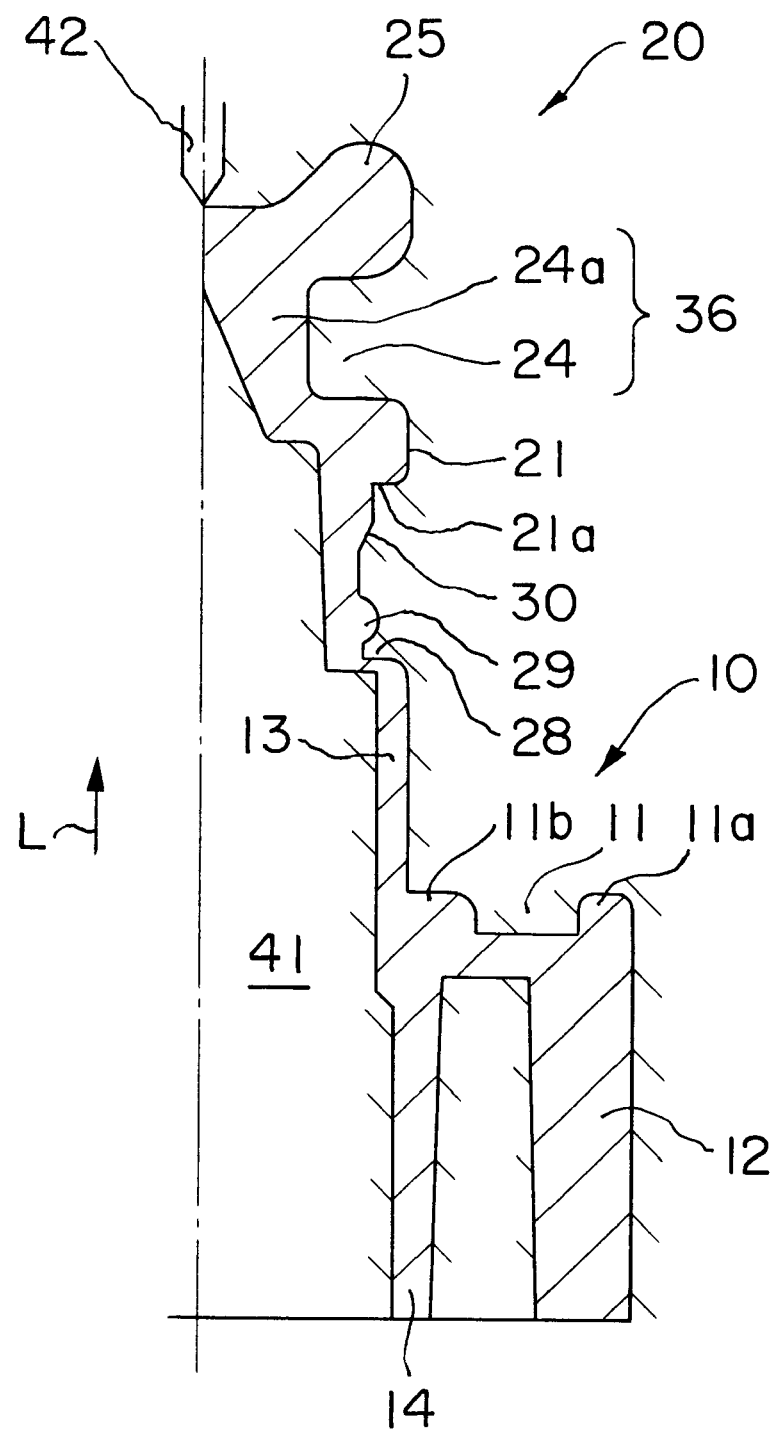
FIG. 21 is an enlarged half sectional view of a spout assembly in a sixth embodiment according to the present invention.

Referring to FIGS. 21 to 23, the spout assembly has a spout 10 having a flange 11 and a cylindrical outer tube 13 connected to the flange 11. The flange 11 is provided at its opposite ends with projections 11a.

A cap 20 is connected to the cylindrical outer tube 13 by a thin wall 28 so as to extend in a direction of arrangement, i.e., the direction of the arrow L.

The cap 20 has a cylindrical middle part 21, a top plate 25 connected to the upper end of the middle part 21 by a connecting part 36, and plugging part 30 extending from the middle part 21 toward the cylindrical outer tube 13. A circumferential circular protrusion 29 is formed on the outer circumference of the plugging part 30. The circular protrusion 29 comes into close contact with the inner circumference of the cylindrical outer tube 13 when the cap 20 is pushed into the cylindrical outer tube 13.

A step 21a is formed on the lower end of the cylindrical middle part 21. The step 21a rests on the upper end of the cylindrical outer tube 13 and the circular protrusion 29 comes into close contact with the inner circumference of the cylindrical outer tube 13 when the cap 20 is pushed into the cylindrical outer tube 13.

As shown in FIG. 21, the spout assembly comprising the spout 10 and the cap 20 is formed in a monolithic structure by injection molding using an injection mold 40. The injection mold 40 is provided with a gate 42 in a portion thereof substantially just above the top plate 25. A core 41 is placed in a cavity in the injection mold 40 to form hollows in the spout 10 and the cap 20.

An upper end portion 41a of the core 41 is tapered toward the top plate 25, i.e., toward the gate 42, and corresponds to the gate 42. A space between the injection mold 40 and the core 41 for forming the thin wall 28 interconnecting the spout 10 and the cap 20 has the least thickness in the direction of the arrow L in which the spout 10 and the cap 20 are arranged.

As shown in FIGS. 22 and 23, the elastic strip 31 is extended between an upper portion of the cylindrical outer tube 13 of the spout 10, and an upper portion of the connecting part 36 of the cap 20. The connecting part 36 has a cylindrical body portion 24a and axial ribs 24 arranged at equal angular intervals on and radially protruding from the circumference of the body portion 24a.

Seventh Embodiment

A spout assembly in a seventh embodiment according to the present invention will be described with reference to FIGS. 24 and 25. In the seventh embodiment shown in FIGS. 24 and 25, a top plate 25 and a cylindrical middle part 21 of a cap 20 are provided in their outer surfaces with serrations 44 and 45, respectively. The spout assembly in the seventh embodiment is substantially the same in other respects as the spout assembly in the fourth embodiment shown in FIG. 18. Therefore, parts shown in FIGS. 24 and 25 like or corresponding to those of the fourth embodiment shown in FIG. 18 are designated by the same reference numerals and the detailed description thereof will be omitted.

Figure 24:
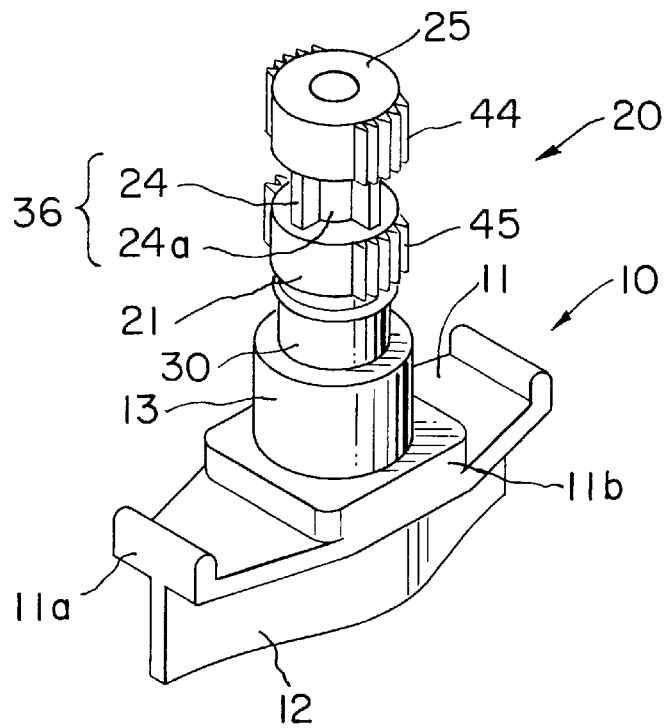
FIG. 24 is a perspective view of a spout assembly in a seventh embodiment according to the present invention.
Figure 25:
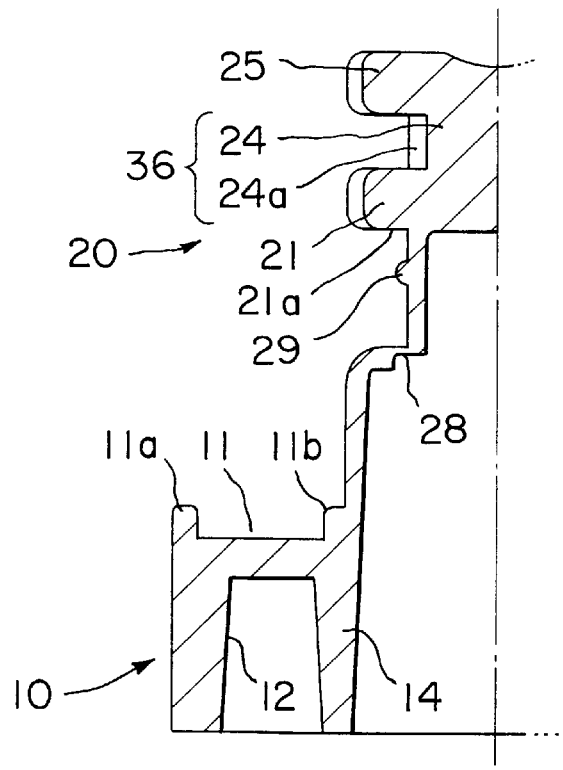
FIG. 25 is a half sectional view of the spout assembly of FIG. 24.

Referring to FIGS. 24 and 25, the spout assembly has a spout 10 having a flange and a cylindrical outer tube 13 connected to the flange 11. The flange 11 is provided with projections 11a at its opposite ends, and a support pad 11b of an increased thickness for supporting the cylindrical outer tube 13 in the middle portion thereof. The cylindrical outer tube 13 and a base 12 are formed on the lower surface of the flange 11.

The cylindrical outer tube 13 is connected to the cap 20 by a thin wall 28. The cap 20 has the cylindrical middle part 21, a top plate 25 connected to the upper end of the middle part 21 by a connecting part 36 having a cylindrical body portion 24a and axial ribs 24 arranged at equal angular intervals on and radially protruding from the circumference of the body portion 24a, and a plugging part 30 extending from the middle part 21 toward the cylindrical outer tube 13. A circumferential circular protrusion 29 is formed on the outer circumference of the plugging part 30. The circular protrusion 29 comes into close contact with the inner circumference of the cylindrical outer tube 13 when the cap 20 is pushed into the cylindrical outer tube 13. A step 21a is formed on the lower end of the cylindrical middle part 21 of the cap 20.

Both the top plate 25 and the cylindrical middle part 21 of the cap 20 have cylindrical outer circumferences, respectively, and the serrations 44 and 45 are formed in the cylindrical outer circumferences. The serrations 44 and 45 enable the firm grip of the cap 20. Either the top plate 25 or the cylindrical middle part 21 may be provided in its outer circumference with serrations.

Eighth Embodiment

A spout assembly in an eighth embodiment according to the present invention will be described with reference to FIGS. 26 to 29. In the eighth embodiment shown in FIGS. 26 to 28, a strip 31 is extended between an upper portion of a cylindrical outer tube 13 of a spout 10, and an upper portion of a connecting part 36 of a cap 20, and a flange 11 employed in the eighth embodiment is different from that employed in the fourth embodiment. The spout assembly in the eighth embodiment is substantially the same in other respects as the spout assembly in the fourth embodiment shown in FIG. 18. Therefore, parts shown in FIGS. 26 to 29 like or corresponding to those of the fourth embodiment shown in FIG. 18 are designated by the same reference numerals and the description thereof will be omitted.

Referring to FIGS. 26 to 29, the spout assembly has a spout 10 having a flange 11, and a cylindrical outer tube 13 connected to the flange 11. The flange 11 is provided with projections 11a at its opposite ends, and a support pad 11b of an increased thickness for supporting the cylindrical outer tube 13. Flat surfaces 11c extends between the projections 11a and the support pad 11b.

The cap 20 is connected to the cylindrical outer tube 13 of the spout 10. The cap 20 has a cylindrical middle part 21, a top plate 25 connected to the upper end of the middle part 21 by a connecting part 36, and a plugging part 30 extending from the middle part 21 toward the cylindrical outer tube 13. A circumferential circular protrusion 29 is formed on an outer circumference of the plugging part 30. The circular protrusion 29 comes into close contact with the inner circumference of the cylindrical outer tube 13 when the cap 20 is pushed into the cylindrical outer tube 13.

A step 21a is formed on the lower end of the cylindrical middle part 21 of the cap 20. The elastic strip 31 is extended between an upper portion of the connecting part 36 of the cap 20, and an upper portion of the cylindrical outer tube 13 of the spout 10. The connecting part 36 has a cylindrical body portion 24a and axial ribs 24 arranged at equal angular intervals on and radially protruding from the circumference of the body portion 24a.

As shown in FIGS. 26 to 29, a recess 46 is formed in an upper portion of the rib 24 opposite the elastic strip 31. When the cap 20 is removed from the spout 10, the cap 20 is hung on the projection 11a of the flange 11 with the projection 11a being in engagement with the recess 46. A portion of the circumference of the top plate 25 of the cap 20 opposite the elastic strip 31 is cut to form a flat surface 25a to be brought into contact with the flat surface 11c of the flange 11.

When the cap 20 is removed from the spout 10, the cap 20 is connected to the spout 10 by the strip 31 and can be firmly held on the flange 11 with the projection 11a of the flange 11 on the side of the strip 31 in engagement with the recess 46 of the rib 24 (FIGS. 26 to 29).

Figure 29:
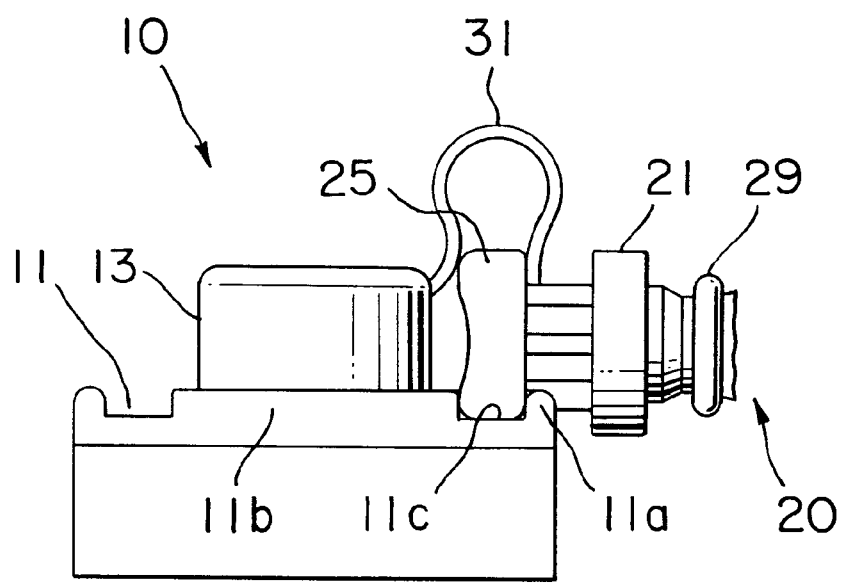
FIG. 29 is a fragmentary sectional view of the spout assembly of FIG. 26.

Since the top plate 25 of the cap 20 has the flat surface 25a to be brought into contact with the flat surface 11c of the flange 11, the top plate 25 can stably held on the flat surface 11c of the flange 11 when the cap 20 is thus held on the flange 11. As shown in FIG. 29, the height of the top plate 25, i.e., the height of the flat surface 25a, is approximately equal to the width of the flat surface 11c of the flange 11, i.e., the distance between the projection 11a and the support pad 11b, the top plate 25 can firmly be held between the projection 11a of the flange 11 and the support pad 11b.

A spout assembly in a modification of the eighth embodiment will be described with reference to FIG. 30. In the spout assembly in the modification shown in FIG. 30, a flange 11 is provided with projections 11a each having a nose 47 projecting outward from the projection 11a, and a cap 20 has a rib 24 provided with a notch 48 with which the nose 47 is to be engaged. The spout assembly shown in FIG. 30 is substantially the same in other respects as the embodiment shown in FIGS. 28 and 29.

Figure 30:
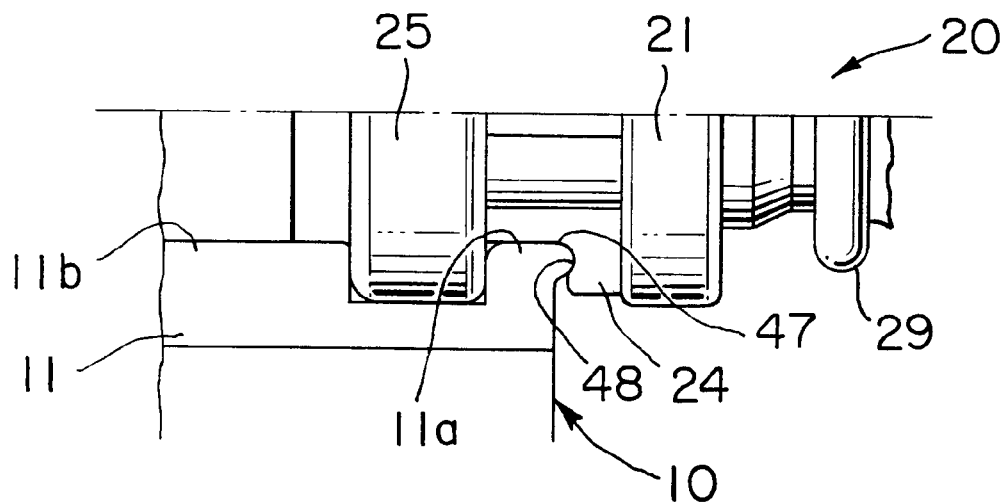
FIG. 30 is a spout assembly in a modification of the spout assembly of FIG. 26.

As shown in FIG. 30, the flange 11 is provided with the nose 47, and the rib 24 is provided with the notch 48 to engage with the nose 47 in a portion of the rib 24 corresponding to the recess 46. The cap 20 can firmly be held on the flange 11 by the engagement of the nose 47 with the notch 48.

In either case, the projection of the flange 11 is used for firmly holding the cap 20. The cap 20 can firmly be held by means of the projection 11a even if the cap 20 is not provided with the flat surface 25a or the recess 46.

Ninth Embodiment

A pouch with a spout assembly in a ninth embodiment according to the present invention will be described with reference to FIGS. 31 to 34.

Figure 31:
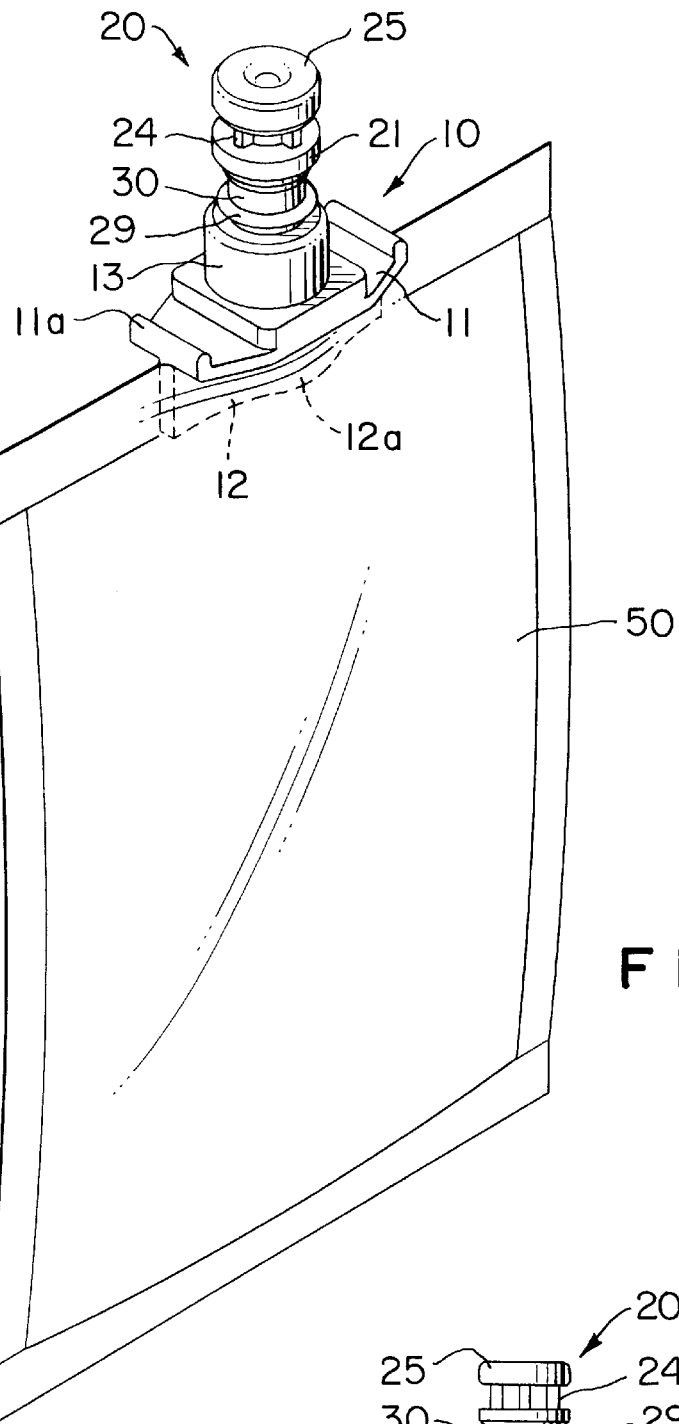
FIG. 31 is a perspective view of a gazette type pouch with a spout assembly in a ninth embodiment according to the present invention.
Figure 32:
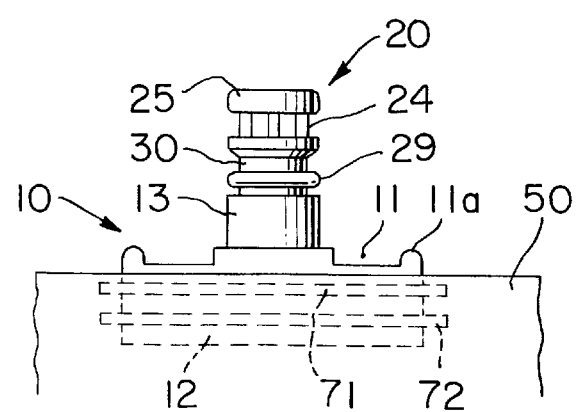
FIG. 32 is an enlarged fragmentary view of the pouch with a spout assembly of FIG. 31.

As shown in FIGS. 31 and 32, a pouch with a spout assembly has a gazette type pouch 50, and a spout assembly having a spout 10 and a cap 20 and hermetically bonded to the substantially middle portion of the upper side of the gazette type pouch 50.

The spout assembly having the spout 10 and the cap 20 is substantially identical with the spout assembly in the fourth embodiment shown in FIG. 18. In FIGS. 31 and 32, parts like or corresponding to those of the spout assembly shown in FIG. 18 are designated by the same reference numerals and the detailed description thereof will be omitted.

A method of bonding the spout assembly having the spout 10 and the cap 20 to the substantially middle portion of the upper side of the gazette type pouch 50 will be described hereinafter. As shown in FIGS. 31 and 32, a base 12 consisting of a pair of attaching plates 12a of the spout assembly is inserted in an open upper end of the gazette type pouch 50.

Then, portions of the gazette type pouch 50 are bonded temporarily to the pair of attaching plates 12a of the base 12, and then the gazette type pouch 50 is bonded to the entire surface of the pair of attaching plates 12a. Then, portions of the gazette type pouch 50 are bonded in the shape of a band to the pair of attaching plates 12a for ring sealing to form two seal rings 71 and 72 arranged one over the other on the surface of the gazette type pouch 50.

Then, the joints of the gazette type pouch 50 and the pair of attaching plates 12a are cooled.

Thus, the pair of attaching plates 12a of the spout assembly having the spout 10 and the cap 20 can hermetically be bonded to the inner surface of the gazette type pouch 50.

Figure 33:
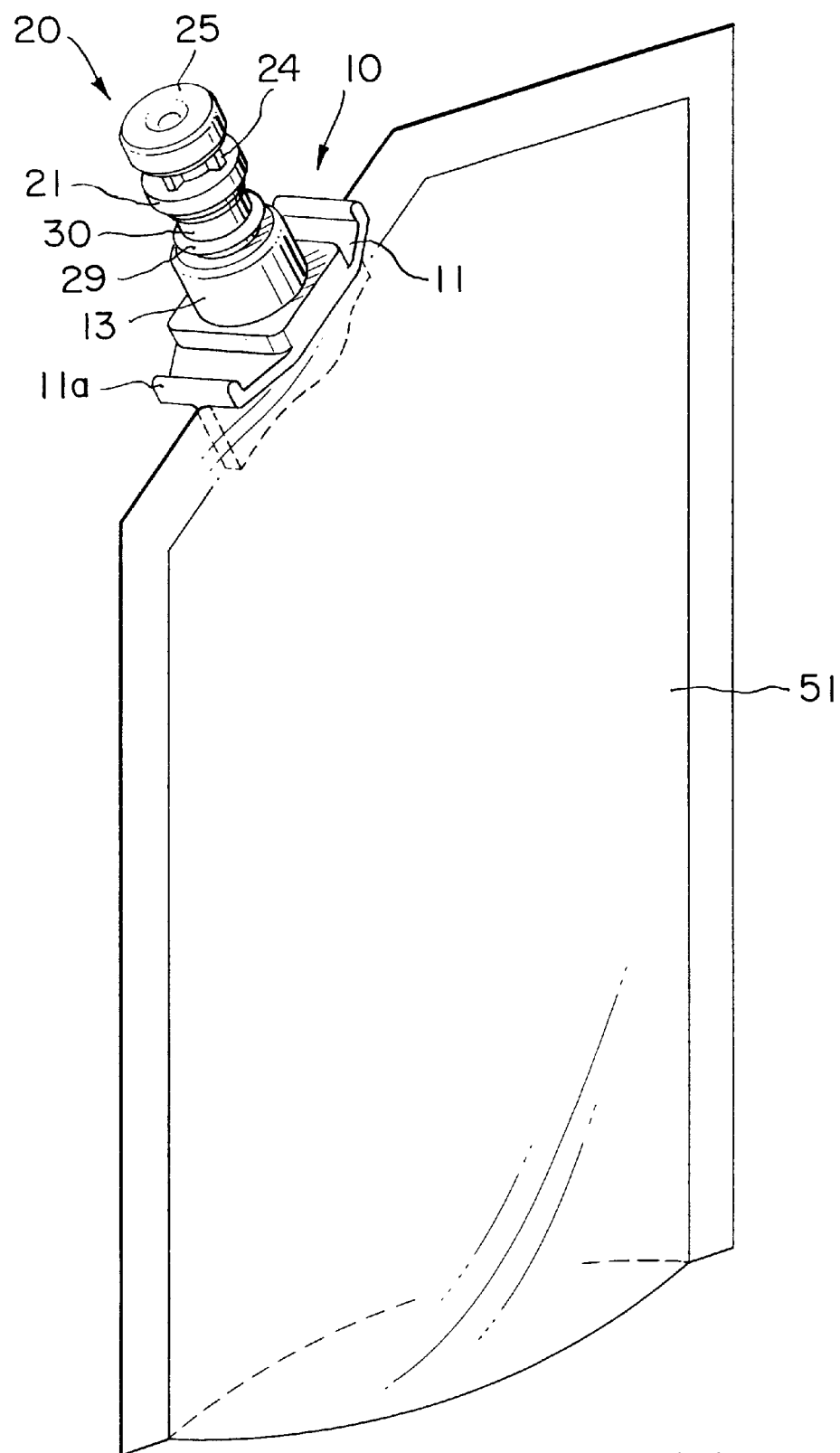
FIG. 33 is a perspective view of a standing pouch with a spout assembly.
Figure 34:
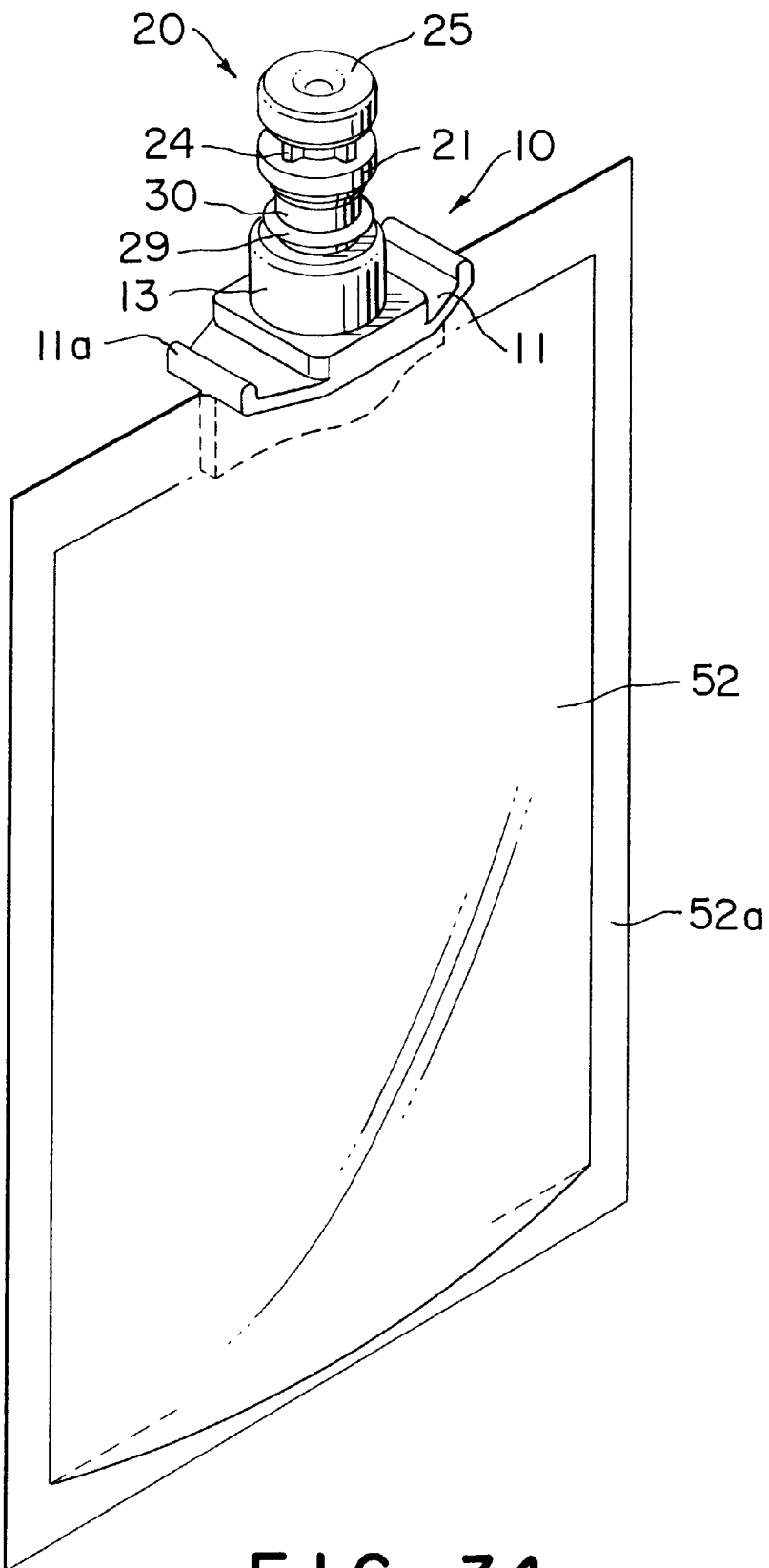
FIG. 34 is a perspective view of a four-sided seal pouch with a spout assembly.

A standing type pouch 51 as shown in FIG. 33 or a four-sided seal pouch 52 having four sealed sides 52a as shown in FIG. 34 may be used instead of the gazette type pouch 50.

Figure 39:
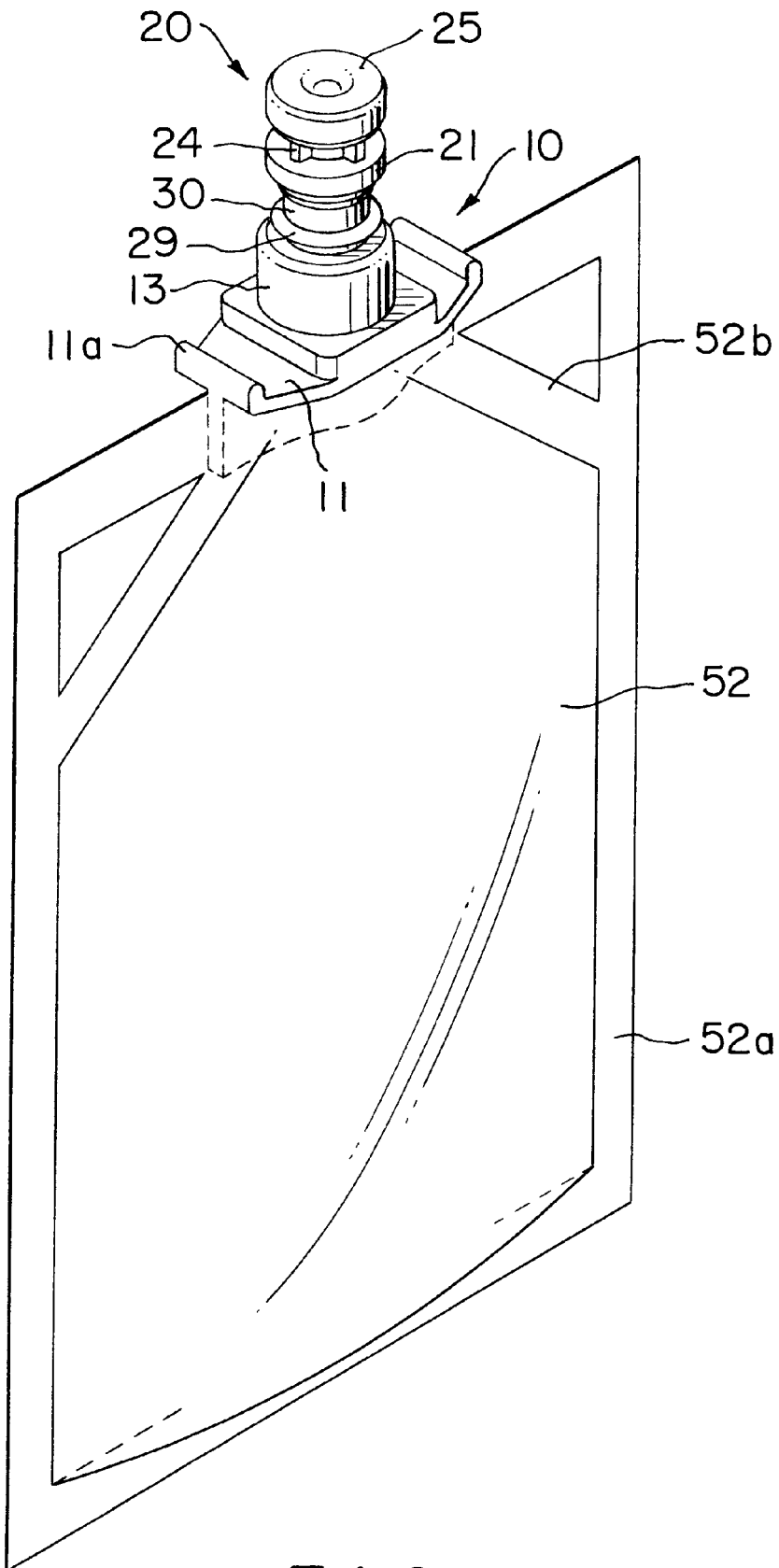
FIG. 39 is a perspective view of another four-sided seal pouch with a spout assembly.

In addition, another four-sided seal pouch 52 having four sealed sides 52a and inclined sealed portions 52b may be used as shown in FIG. 39. The inclined sealed portions 52b extend between a side end and a top end of the seal pouch 52 so that contents within the seal pouch 52 can be easily introduced toward the spout 10.

Although the inclined sealed portion 52b are provided in the four-sided seal pouch 52, the inclined sealed portions 52b may be provided in the gazette type pouch 50 as shown in FIG. 31, in the standing type pouch 51 as shown in FIG. 33 or in any other pouch having sealed sides.

Materials for forming the pouches 50, 51 and 52 will be described hereinafter. Suitable materials are used selectively taking into consideration the kinds of contents to be packaged in the pouches 50, 51 and 52 and materials forming the spout 10 and the cap 20 of the spout assembly. The pouches 50, 51 and 52 are made of materials for forming ordinary flexible packages.

Usually, the pouches 50, 51 and 52 are made of a laminated film, such as a laminated film having a surface layer and a sealant layer or a laminated film having a surface layer, an intermediate layer and a sealant layer laminated in that order. The surface layer and the intermediate layer may be a layer of a single film or a multilayer of a plurality of types of films. The adjacent layers of the laminated film may be bonded together with an adhesive layer.

The surface layer must have excellent printability and fitness for lamination, excellent mechanical properties including high tensile strength, high impact resistance and high scratch resistance, excellent chemical properties including solvent resistance, chemical resistance and heat resistance that withstands heat used for heat sealing.

Films meeting such requirements are, for example, biaxial oriented polyester films, biaxial oriented nylon films, biaxial oriented polypropylene films and films obtained by coating those films with polyvinylidene chloride (PVDC) fir moisture-proofing and gas-proofing. Those films may be used individually or laminated films formed by laminating two or more of those films may be used. Suitable thickness of the surface layer is in the range of 9 to 50 $\mu$m.

A surface layer of a thickness less than 9 $\mu$m is undesirable because such a surface layer has insufficient strength, poor printability and inferior fitness for lamination. A surface layer of a thickness greater than 50 $\mu$m is undesirable because such a surface layer has an excessive strength for a small pouch, which is to be provided by the present invention, and such an excessively thick surface layer is costly.

The intermediate layer is used to enhance the mechanical strength of the laminated film or to improve the moisture-proofing and gas-proofing properties of the laminated film. Suitable films for the intermediate layer are, for example, nylon films, polyvinyl alcohol films, saponified ethylene-vinyl acetate copolymer films (EVOH), aluminum foils, and resin films coated with a thin film of a thickness in the range of 400 to 600 Å of aluminum, silicon dioxide or alumina by vacuum evaporation. Those films are used selectively according to purposes. A suitable thickness of the intermediate layer is in the range of about 7 to about 50 $\mu$m.

An intermediate layer of a thickness less than 7 $\mu$m is undesirable because such an intermediate layer is unsatisfactory in strength, performance, such as impermeability, and processing suitability, such as fitness for lamination. An intermediate layer of a thickness greater than 50 $\mu$m is undesirable because such an excessively thick intermediate layer has excessive performance characteristics and is costly.

The intermediate layer may be formed by laminating a film to a film forming the surface layer by a known dry lamination process or an extrusion lamination process which extrudes a hot-melt resin, such as polyethylene, through a T die into the interface between the films for forming the surface layer and the intermediate layer and applies pressure to the films, i.e., a sandwich lamination process, when a previously manufactured film for forming the intermediate layer is fed. When resin pellets are used for forming the intermediate layer, the intermediate layer may be formed by an extrusion coating process which melts the resin pellets, and extrudes the molten resin in a film over a film forming the surface layer or by a process which forms a film by inflation molding and bonds the film by a dry lamination process or an extrusion lamination process to the film forming the surface layer.

When laminating a film for forming the intermediate layer to a film forming the surface layer, a surface of the film forming the surface layer and to which a film for forming the intermediate layer is to be laminated may be subjected to a corona discharge process and coated with an anchor coat of an organic titanium base, urethane base, imine base or rubber base anchor coating material to stabilize the adhesion between the surface layer and the intermediate layer.

The sealant layer is the innermost layer of the laminated film. When fabricating a pouch by processing the laminated film, the sealant layer must develop a sufficiently high adhesive strength when heat and pressure is applied thereto by a sealing machine. The sealant layer must have high suitability to be welded to the material of the spout assembly having the spout 10 and the cap 20, and resistance against the deteriorative actions of the contents of the pouch because the sealant layer is to come into direct contact with the contents.

Suitable materials for forming the sealant layer are a low-density polyethylene (LDPE), a linear low-density polyethylene (LLDPE), a polypropylene (PP), an ethylene-vinyl acetate copolymer (EVA), an ethylene-acrylic-acid copolymer (EAA), an ethylene-ethyl-acrylic-acid copolymer (EEA), an amorphous polyester and polyolefin resins such as ionomers. A suitable one of those materials is selected taking into consideration the material of the spout assembly having the spout 10 and the cap 20 and the kind of the contents.

The sealant layer may be formed on the inner surface of a surface layer or a film having a surface layer and an intermediate layer by spreading a suitable one of the foregoing materials by an extrusion coating process or may be formed by forming a film of a suitable one of the foregoing materials and laminating the film to a surface layer or a film having a surface layer and an intermediate layer by a dry lamination process. The surface on which the sealant layer is to be formed by be subjected to a corona discharge process or coated with an anchor coat to stabilize the adhesion between the laminated surfaces.

A sealant layer of a thickness less than 15 $\mu$m is undesirable because such a sealant layer is unable to develop a sufficiently high heat-sealing strength. A sealant layer of a thickness greater than 200 $\mu$m does not develop a particularly high heat-sealing strength, requires an increase heat-sealing time and increases the material cost.

The pouches 50, 51 and 52 are fabricated by heat bonding by the laminated film by a bag making machine or an in-line bag making and charging machine, i.e., a machine having in-line stations for a bag making process and a bag charging process.

EXAMPLES

Examples of the ninth embodiment will be described with reference to FIGS. 35 to 38.

Sample spout assemblies (10, 20) were made of a polypropylene (PP), a low-density polyethylene (LDPE) or a linear low-density polyethylene (LLDPE), for example, the LLDPE, and the breaking strength of the sample spout assemblies (10, 20) was measured.

Different substances were filled in sample pouches 50, 51 and 52 provided with the spout assembly, and the sealing strength of the sample pouches 50, 51 and 52 were measured.

Figure 35:
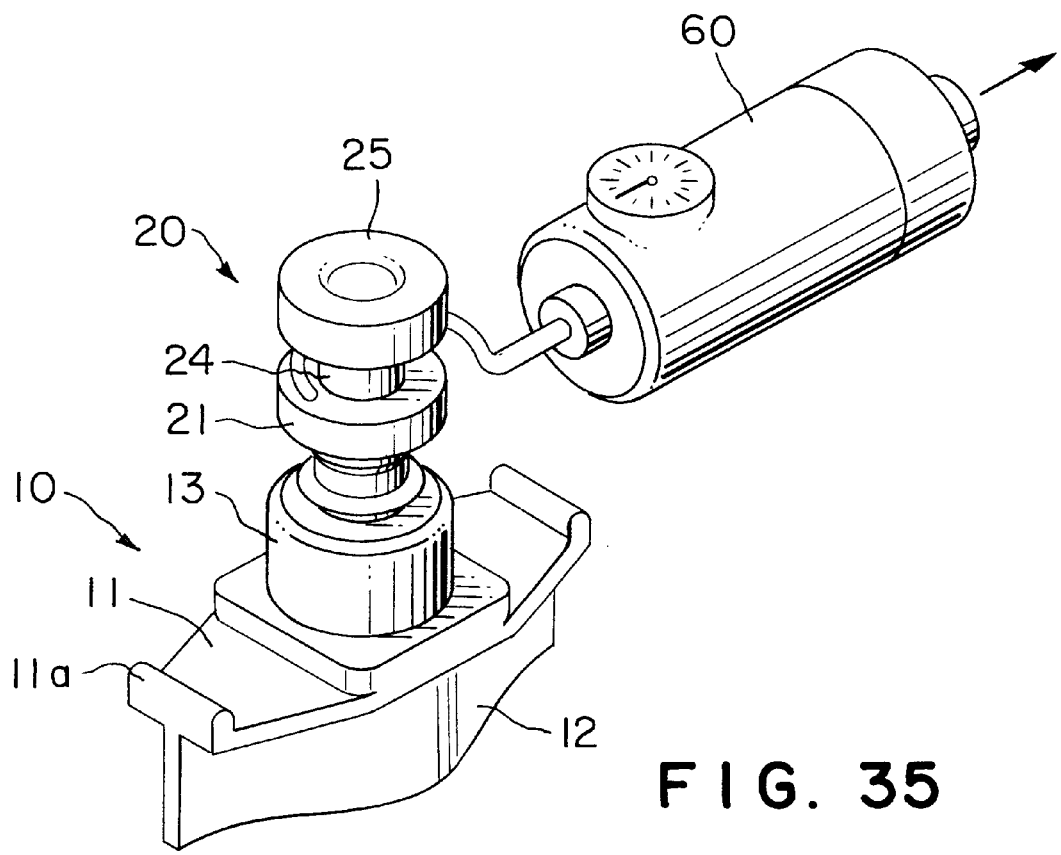
FIG. 35 is a perspective view of a spout assembly showing a state in which the spout assembly is pulled by a push-pull measuring device.
Figure 36:
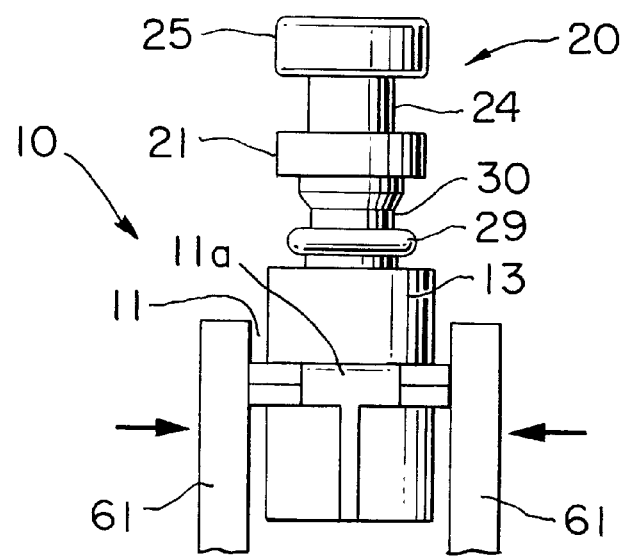
FIG. 36 is a side view of a spout assembly held by a vise.

When measuring the breaking strength of the sample spout assembly (10, 20), the sample spout assembly (10, 20) was held by the flange 11 by a vise 61 as shown in FIG. 36, and then the cap 20 of the sample spout assembly (10, 20) was pulled by a push-pull gage as shown in FIG. 35 to measure the breaking strength of the sample spout assembly (10, 20).

Figure 37:
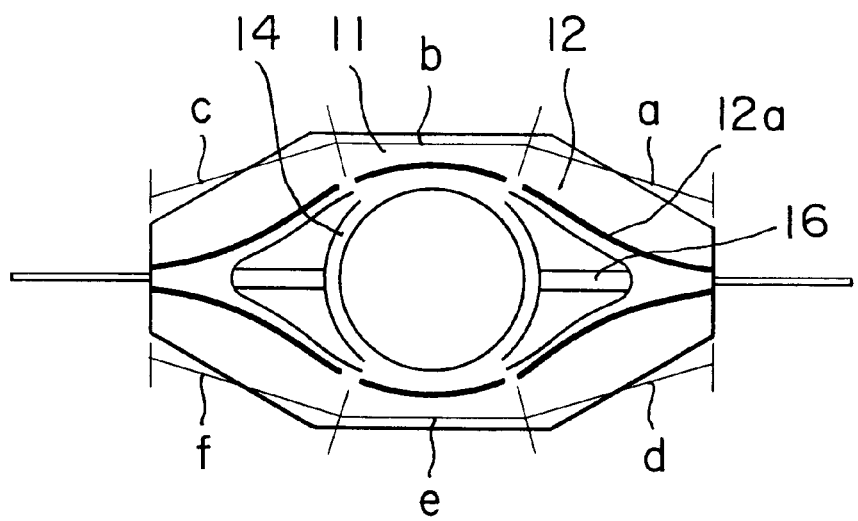
FIG. 37 is a bottom view of a spout assembly subjected to a sealing strength test.
Figure 38:
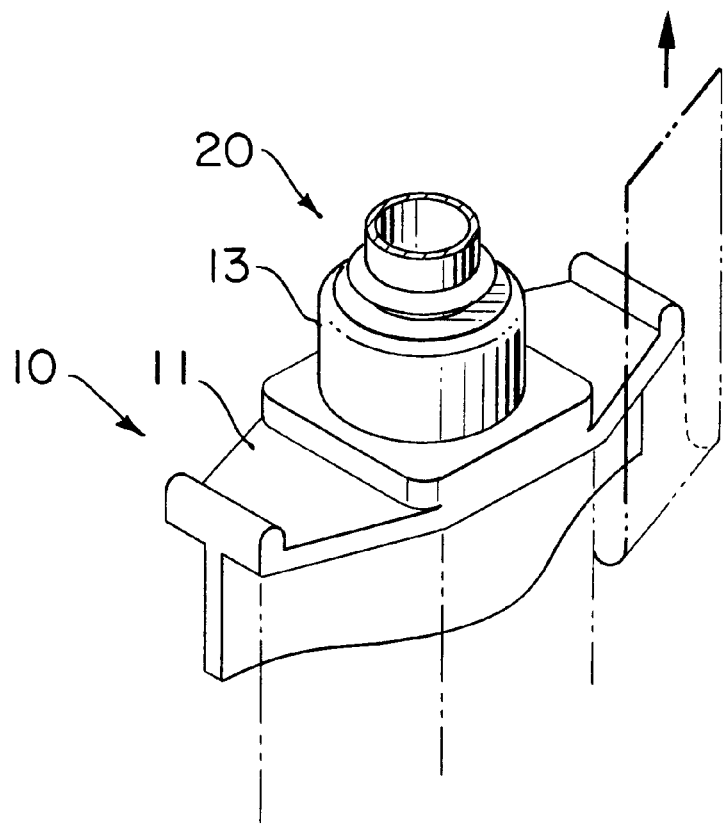
FIG. 38 is a perspective view of a spout assembly subjected to a sealing strength test.

When measuring the sealing strength, the pair of attaching plates 12a of the sample spout assemblies (10, 20) were divided into six sections a, b, c, d, e, and f as shown in FIG. 37, portions of the sample pouches 50, 51 and 52 were bonded to the sections a, b, c, d, e, and f of the pair of attaching plates 12a, and then the portions of the sample pouches 50, 51 and 52 were pulled upward by a tensile testing machine to measure the breaking strengths of the pouches 50, 51 and 52 (FIG. 38).

Conditions for the measurement of breaking strength and sealing strength and the measured results are as follows.

Breaking Strength and Sealing Strength

Evaluation of Physical Properties of Container with Spout Assembly

1. Test Samples
   ① Material of spout assembly: LLDPE
   ② Pouch: PET/ON/LLDPE
   ③ Contents: A, B, C
2. Method of Evaluation The sample pouches with a spout assembly were charged with the contents, respectively, the sample pouches were sealed, kept in a 50-degree dry atmosphere for 300 hr, and the sample pouches were subjected to breaking strength measurement and sealing strength measurement.

3. Results of Measurement
   ① Breaking strength before charging the sample pouches with the contents (Push-pull gage).

| Breaking strength (kg) | | | | |
| --- | --- | --- | --- | --- |
| 2.85 | 2.70 | 2.50 | 2.25 | 2.30 |
| 2.75 | 2.20 | 2.80 | 2.75 | 2.70 |
| | | | Mean 2.58 | |

② Breaking strength after storage (Push-pull gage)

| Contents | Breaking strength (kg) | | | Mean |
| --- | --- | --- | --- | --- |
| Content A | 2.90 | 2.96 | 2.50 | 2.77 |
| Content B | 2.50 | 2.50 | 2.40 | 2.47 |
| Content C | 2.55 | 2.90 | 2.80 | 2.75 |

③ Sealing strength before charging (Tensile testing machine)

Each pouch was cut into six sections, and each section was pulled with the spout assembly held by the fixed clamp of the tensile testing machine to measure the breaking strength.

The mean sealing strength was 4.87 kg.

④ Sealing strength after storage (Tensile testing machine)

Each pouch was cut into six sections, and each section was pulled with the spout assembly held by the fixed clamp of the tensile testing machine to measure the breaking strength for the contents A, B and C.

| Sealing strength (kg) | | | | | | Mean (kg) |
|---|---|---|---|---|---|---|
| Content A | | | | | | |
| 3.83 | 5.47 | 4.94 | 7.13 | 3.49 | | 4.93 |
| 7.17 | 5.99 | 4.60 | 4.93 | 2.47 | | 4.83 |
| 4.30 | 6.60 | 4.53 | 4.83 | 4.73 | | 5.00 |
| Content B | | | | | | |
| 3.90 | 5.23 | 5.05 | 6.95 | — | | 5.02 |
| 4.69 | 5.92 | 3.08 | 4.44 | 4.43 | | 4.90 |
| 4.42 | 5.38 | 4.68 | 3.77 | 2.60 | | 4.53 |

| Content C | | | | | | |
|---|---|---|---|---|---|---|
| Sealing strength (kg) | | | | | | Mean (kg) |
| 3.22 | 6.47 | 5.00 | 4.54 | 6.06 | 3.60 | 4.82 |
| 6.06 | 7.67 | 5.30 | 4.80 | 6.68 | — | 6.10 |
| 4.11 | 5.69 | 4.66 | 5.88 | 2.97 | — | 4.66 |

4. Examination

① Changes in breaking strength for the contents A, B and C due to storage are not very large.

② Changes in sealing strength for the contents A, B and C due to storage may be considered to be insignificant.

I claim:

1. A spout assembly comprising:

a spout comprising an outer tube located outside a package, and a base attached to an inner surface of the package;

a cap coaxial with said outer tube and separably connected to an extremity of said outer tube through a thin wall in a position in which said cap is insertable into said outer tube; and said cap being separable from said outer tube and insertable into said outer tube to seal said spout; wherein said cap also comprising a step seatable on the extremity of said outer tube when said cap is inserted into said outer tube, and a distal end portion of said cap further comprising a circumferential protrusion engageable with an inner circumference of said outer tube when said cap is inserted in said outer tube; and said base comprising a pair of attaching plates whose surfaces extend in substantially the same direction as the axis of the spout, and an inner tube formed between said pair of attaching plates and connected to the outer tube, wherein respective opposite lateral ends of said pair of attaching plates are joined together, and the inner tube passes between said attaching plates between said opposite lateral ends thereof.

2. The spout assembly according to claim 1, wherein, the outer tube is provided on an inner circumference of the outer tube with a protrusion with which a broken fin formed at an end of the cap engages when the cap is inserted into said outer tube.

3. The spout assembly according to claim 1, wherein said outer tube is provided on an inner circumference of said outer tube with a second protrusion with which the circumferential protrusion of said cap engages when said cap is inserted into said outer tube.

4. The spout assembly according to claim 1, wherein hollows are formed between said pair of attaching plates and the inner tube on the opposite lateral sides of said inner tube.

5. The spout assembly according to claim 4, wherein a pair of ribs are extended between the joints of the corresponding opposite ends of said pair of attaching plates and the inner tube, respectively, in a direction substantially parallel to said pair of attaching plates.

6. The spout assembly according to claim 1, wherein said spout and said cap are interconnected by a strip.

7. The spout assembly according to claim 6, wherein said spout is provided with a flange between said outer tube and said base, and said flange has a projection at least at one end thereof on the side of the strip.

8. The spout assembly according to claim 7, wherein said cap is provided with a recess which can be brought into engagement with the projection of said flange.

9. The spout assembly according to claim 8, wherein said cap has a cylindrical middle part and a top plate connected to the cylindrical middle part by a connecting part, the recess is formed in said connecting part, and said top plate has a contact surface to be brought into contact with said flange.

10. The spout assembly according to claim 9, wherein a notch is formed in the recess of said connecting part of said cap, and a nose capable of engaging with the notch of said connecting part is formed on the projection of said flange.

11. The spout assembly according to claim 1, wherein said outer tube has a cylindrical shape, said outer tube is provided on an inner circumference of said outer tube with an internal thread, said cap has a cylindrical shape, and said cap is provided on an outer circumference of said cap with an external thread mating with the internal thread of said outer tube.

12. The spout assembly according to claim 1, wherein:

said spout and said cap are formed in a monolithic structure by injecting a resin into an injection mold provided with a core, said cap has a top plate, a hollow extending near to said top plate is formed in said cap by said core, and the hollow in said cap is tapered toward said top plate.

13. The spout assembly according to claim 1, wherein:

said spout and said cap are formed in a monolithic structure by injecting a resin into an injection mold provided with a core, said outer tube of said spout and said cap are interconnected by a thin wall having the least thickness in a direction in which said spout and said cap are connected to each other.

14. The spout assembly according to claim 1, wherein an outer circumference of said spout or said cap is satin-finished.

15. A spout assembly comprising:

a spout comprising an outer tube located outside a package, and a base attached to an inner surface of the package;

a cap coaxial with said outer tube and separably connected to an extremity of said outer tube through a thin wall in a position in which said cap is insertable into said outer tube;

said cap being separable from said outer tube and insertable into said outer tube to seal said spout; and said spout being provided between said outer tube and said base, with a flange having projections at each of its opposite lateral ends.

16. The spout assembly according to claim 15, wherein said flange has a outer tube support pad supporting said outer tube, and a surface of said outer tube support pad is flush with extremities of said projections of the flange.

17. The spout assembly according to claim 16, wherein said respective side edges of said outer tube support pad and said projections of the flange are straight.

18. A spout assembly comprising:

a spout comprising an outer tube located outside a package, and a base attached to an inner surface of the package;

a cap coaxial with said outer tube and separably connected to an extremity of said outer tube in a position in which said cap is insertable into said outer tube;

said cap being separable from said outer tube and insertable into said outer tube to seal said spout; and said cap including a cylindrical middle part and a top plate connected to said cylindrical middle part by a connecting part; and said connecting part having four axial ribs arranged at equal angular intervals.

19. The spout assembly according to claim 18, wherein at least the outer circumference of said cylindrical middle part or said top plate is provided with serrations.

* * * * *